(12) United States Patent
Kwon et al.

(10) Patent No.: US 10,491,287 B2
(45) Date of Patent: Nov. 26, 2019

(54) WIRELESS COMMUNICATION METHOD USING NEAR FIELD COMMUNICATION, AND ELECTRONIC DEVICE

(71) Applicant: Samsung Electronics Co., Ltd., Gyeonggi-do (KR)

(72) Inventors: Jaecheol Kwon, Daegu (KR); Yukyung Kim, Daegu (KR); Jungkuk Seo, Gyeongsangbuk-do (KR); Seungyun Song, Daegu (KR); Seungjae Lee, Daegu (KR); Jongmu Choi, Gyeonggi-do (KR); Sungjun Kim, Daegu (KR); Janghoon Lee, Gyeongsangbuk-do (KR); Yeunwook Lim, Daegu (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/775,510

(22) PCT Filed: Oct. 7, 2016

(86) PCT No.: PCT/KR2016/011270
§ 371 (c)(1),
(2) Date: May 11, 2018

(87) PCT Pub. No.: WO2017/086599
PCT Pub. Date: May 26, 2017

(65) Prior Publication Data
US 2018/0359017 A1 Dec. 13, 2018

(30) Foreign Application Priority Data
Nov. 19, 2015 (KR) .................. 10-2015-0162792

(51) Int. Cl.
*H04L 1/02* (2006.01)
*H04B 7/06* (2006.01)
(Continued)

(52) U.S. Cl.
CPC ......... *H04B 7/0689* (2013.01); *H04B 7/0413* (2013.01); *H04B 7/0691* (2013.01);
(Continued)

(58) Field of Classification Search
CPC .............. H04L 27/2647; H04L 5/0007; H04L 27/2657; H04L 1/0618; H04L 1/06;
(Continued)

(56) References Cited

U.S. PATENT DOCUMENTS 8,565,818 B1* 10/2013 Bertz ................. H04M 1/7253
379/218.01
2005/0030917 A1* 2/2005 Haller ............... H04L 29/12311
370/328

(Continued)

FOREIGN PATENT DOCUMENTS

EP          2 779 752 A1    9/2014
KR   10-2012-0090080 A     8/2012
(Continued)

OTHER PUBLICATIONS

European Search Report dated Sep. 10, 2018.

*Primary Examiner* — Khai Tran
(74) *Attorney, Agent, or Firm* — Cha & Reiter, LLC.

(57) ABSTRACT

The present disclosure relates to a wireless communication method using near field communication, and an electronic device, and in the electronic device supporting first near field communication and second near field communication, a request for the second near field communication is confirmed while the electronic device is connected to a first external device through the first near field communication,
(Continued)

circumstantial information related to the first external device (for example, the intensity of an electric field signal) is checked on the basis of at least the confirmation, and a second external device can be connected to the first external device (for example, an AP) or to a third external device (for example, base station (server)) through the electronic device by using the second near field communication, when the circumstantial information satisfies a predetermined condition. In addition, other examples are possible.

18 Claims, 14 Drawing Sheets

(51) Int. Cl.
*H04W 88/06* (2009.01)
*H04W 76/10* (2018.01)
*H04B 7/08* (2006.01)
*H04W 4/80* (2018.01)
*H04B 7/0413* (2017.01)

(52) U.S. Cl.
CPC ............ *H04B 7/0874* (2013.01); *H04W 4/80* (2018.02); *H04W 76/10* (2018.02); *H04W 88/06* (2013.01)

(58) Field of Classification Search
CPC ... H04B 7/0691; H04B 7/0413; H04W 84/12; H04W 76/10
USPC .................. 375/267, 260; 370/328; 455/41.2
See application file for complete search history.

(56) References Cited

U.S. PATENT DOCUMENTS

| | | |
|---|---|---|
| 2011/0081858 A1 | 4/2011 | Tolentino et al. |
| 2013/0301617 A1 | 11/2013 | Kuhn et al. |
| 2014/0195654 A1 | 7/2014 | Kiukkonen et al. |
| 2014/0274021 A1 | 9/2014 | Jang et al. |
| 2014/0287704 A1 | 9/2014 | Dupuy et al. |
| 2014/0355527 A1 | 12/2014 | Vaidya et al. |
| 2015/0063312 A1 | 3/2015 | Vissa |
| 2015/0092708 A1 | 4/2015 | Su et al. |
| 2015/0282195 A1 | 10/2015 | Farhadi |
| 2016/0198290 A1* | 7/2016 | Hong .................... H04B 17/318 455/41.2 |
| 2018/0279103 A1* | 9/2018 | Hong .................... H04B 17/318 |

FOREIGN PATENT DOCUMENTS

| | | |
|---|---|---|
| KR | 10-2013-0080489 A | 7/2013 |
| WO | 2014/145162 A2 | 9/2014 |

* cited by examiner

MINO

SISO

WIRELESS COMMUNICATION METHOD USING NEAR FIELD COMMUNICATION, AND ELECTRONIC DEVICE

CLAIM OF PRIORITY

This application is a National Phase Entry of PCT International Application No. PCT/KR2016/011270, which was filed on Oct. 7, 2016, and claims a priority to Korean Patent Application No. 10-2015-0162792, which was filed on Nov. 19, 2015, the contents of which are incorporated herein by reference.

BACKGROUND

Field

The present disclosure relates to a method and apparatus for wireless communication using a short range wireless connection.

Description of the Related Art

A short-range wireless communication is implemented using a communication standard for short-range wireless communications such as wireless local area network (WLAN), Bluetooth (BT), ZigBee, Z-Wave, ultra-wide band (UWB), ultra-narrow band (UNB), wireless universal serial bus (WirelessUSB), wireless gigabit (WiGig), Bluetooth low energy (BLE), WirelessHD, wirelessTransferJet, and wireless FireWire. Such communication technologies may be used for different purposes. For example, BLE may be used for always-on communication with low power consumption.

Electronic devices may be designed for providing users with wireless communication services using a short-range wireless communication technology. The WLAN (Wi-Fi) may be used for data transfer and Internet access. Typically, the WLAN (Wi-Fi) operates in two Wi-Fi frequency bands (i.e., 2.4 GHz and 5 GHz bands) such that the electronic devices communicate using one of the two Wi-Fi frequency bands (i.e., 2.4 GHz or 5 GHz). An electronic device may select one of the two Wi-Fi frequency bands according to a communication situation. For example, if the data in the 2.4 GHz band is low, the electronic device may perform Wi-Fi communication in the 5 GHz band. If the electronic device supports both the two Wi-Fi frequency bands, it may select preferentially the 5 GHz frequency band with the higher maximum data rate. The electronic device may perform communication in one of the two Wi-Fi frequency bands.

The electronic device may use two antennas for Wi-Fi communication in a multi-input multi-output (MIMO) mode in one of the two Wi-Fi frequency bands.

DISCLOSURE

Technical Problem

In the case where an electronic device supporting multiple short-range communication schemes enables a short-range (e.g., short distance) communication scheme while maintaining enablement of another short-range communication scheme, the newly enabled short-range communication scheme may affect the other short-range communication scheme. For example, if the coverage of the two short-range communication schemes are different from each other, the previously established short-range communication link may be released. In the case where a legacy electronic device is attempting to establish a second short-range communication link while maintaining a first short-range communication link, it is likely that the first short-range communication link will be released.

The present disclosure provides a method for establishing a communication scheme (e.g., mobile hotspot) while maintaining enablement of another communication scheme (connection to an AP) for use of two short-range communication frequency bands simultaneously.

Technical Solution

In accordance with an aspect of the present disclosure, a method includes checking, at an electronic device supporting a first short range wireless communication and a second short range communication, for a request for the second short range wireless communication during a connection with a first external device through the first short range wireless communication; checking status information (e.g., electric field signal strength) related to the first external device based on at least the check; and connecting, when the status information fulfils a predetermined condition, a second external device to the first external device (e.g., AP (access point) or a third external device (e.g., LTE (long term evolution) status-base station (e.g., server)) using the second short range wireless communication.

In accordance with another aspect of the present disclosure, an electronic device includes a communication module configured to support a first short range wireless communication and a second short range communication; and a processor connected functionally to the communication module and configured to control to check for a request for the second short range wireless communication during a connection with a first external device through the first short range wireless communication, check status information related to the first external device based on at least the check, and connect, when the status information fulfils a predetermined condition, a second external device to the first external device or a third external device using the second short range wireless communication.

Advantageous Effects

The present disclosure provides a method for enabling a communication scheme while maintaining enablement of another communication for use of two frequency bands simultaneously. For example, the present disclosure makes it possible for use of a mobile hotspot communication while maintaining a Wi-Fi communication by means of a communication module supporting multiple short-range communication schemes. If a user uses a Wi-Fi communication-based mobile hotspot, it may be possible to minimize data usage charges.

The present disclosure provides a method for switching from a multi-input multi-output(MIMO) mode for simultaneous use of two frequency bands from a single-input single-output (SISO) mode without breakage of a communication session. The electronic device may use of another frequency band for communication without releasing a previously established communication link.

MODE FOR DISCLOSURE

Figure 1:
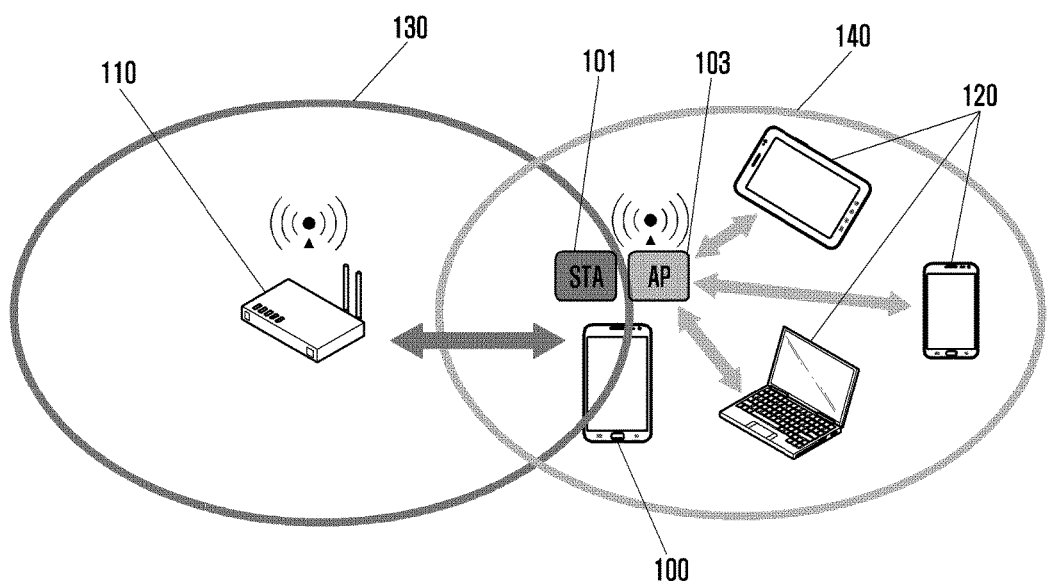
FIG. 1 is a diagram illustrating an exemplary situation where an electronic device uses Wi-Fi and mobile hot spot (MHS) communications simultaneously according to various embodiments of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used to enable a clear and consistent understanding of the present disclosure. Accordingly, it should be apparent to those skilled in the art that the following description of various embodiments of the present disclosure is provided for illustration purpose only, and not for the purpose of limiting the present disclosure as defined by the appended claims and their equivalents.

It is to be understood that the singular forms "a", "an", and "the", may include plural referents unless the context clearly dictates otherwise. Thus, for example, reference to "a component surface", includes reference to one or more of such surfaces.

In various embodiments of the present disclosure, the terms such as "include", "have", "may include" or "may have", may be construed to denote a certain characteristic, number, operation, constituent element, component or combination thereof, but should not be construed to exclude the existence of or a possibility of addition of one or more other characteristics, numbers, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second", used in various embodiments of the present disclosure, may use various components of the various embodiments, but does not limit the corresponding components. For example, the above expressions do not limit the sequence and/or importance of the components. The expressions may be used for simply distinguishing one component from other components. For example, a first user device and a second user device indicate different user devices, although both of them are user devices. For example, without departing from the scope of the present disclosure, a first structural element may be referred to as a second structural element. Similarly, the second structural element may be referred to as a first structural element.

When it is stated that a component is "(operatively or communicatively) coupled to" or "connected to" another component, the component may be directly coupled or connected to another component, or an additional component may exist between the component and another component. In contrast, when it is stated that a component is "directly coupled to" or "directly connected to" another component, an additional component or other feature does not exist between the component and another component. In the present disclosure, the expression "configured (or set) to do" may be used to be interchangeable with, for example, "suitable for doing," "having the capacity to do," "designed to do," "adapted to do," "made to do," or "capable of doing." The expression "configured (or set) to do" should not be used to refer to only something in hardware for which it is "specifically designed to do." Instead, the expression "a device configured to do" may indicate that the device is "capable of doing" something with other devices or parts. For example, the expression "a processor configured (or set) to do A, B and C" may refer to a dedicated processor (e.g., an embedded processor) or a generic-purpose processor (e.g., central processing unit (CPU) or application processor (AP)) that may execute one or more software programs stored in a memory device to perform corresponding functions.

An electronic device according to various embodiments of the present disclosure may be a device, including an antenna. For example, the electronic device may be one or more of the following: a smart phone, a tablet personal computer (PC), a mobile phone, a video phone, an e-book reader, a desktop PC, a laptop PC, a netbook computer, a personal digital assistant (PDA), a portable multimedia player (PMP), a Moving Picture Experts Group phase 1 or phase 2 (MPEG-1 or MPEG-2) audio layer 3 (MP3) player, a mobile medical application, a camera, a wearable device (for example, a head-mounted-device (HMD), such as electronic glasses, electronic clothes, an electronic bracelet, an electronic necklace, an electronic appcessary, an electronic tattoo, and a smart watch) and the like.

According to some embodiments, the electronic device may be a smart home appliance having an antenna. The smart home appliance may include at least one of the following: a television (TV), a digital video disc (DVD) player, an audio player, an air conditioner, a cleaner, an oven, a microwave oven, a washing machine, an air purifier, a set-top box, a TV box (for example, Samsung HomeSync™, Apple TV™, or Google TV™), game consoles, an electronic dictionary, an electronic key, a camcorder, an electronic frame and the like.

According to some embodiments, the electronic device may include at least one of the following: various types of medical devices (for example, magnetic resonance angiography (MRA), magnetic resonance imaging (MRI), computed tomography (CT), a scanner, an ultrasonic device and the like), a navigation device, a global positioning system (GPS) receiver, an event data recorder (EDR), a flight data recorder (FDR), a vehicle infotainment device, electronic equipment for a ship (for example, a navigation device for ship, a gyro compass and the like), avionics, a security device, a head unit for a vehicle, an industrial or home robot, an automatic teller machine (ATM) of financial institutions, a point of sale (POS) device of shops and the like.

According to some embodiments, the electronic device may include at least one of the following: furniture or a part of a building/structure, an electronic board, an electronic signature receiving device, a projector, various types of measuring devices (for example, a water meter, an electricity meter, a gas meter, a radio wave meter and the like), which are equipped with an antenna and the like. The electronic device according to various embodiments of the present disclosure may also be a combination of the devices listed above. Further, the electronic device according to various embodiments of the present disclosure may be a flexible device. It should be apparent to those skilled in the art that the electronic device according to various embodiments of the present disclosure is not limited to the above described devices.

Hereinafter, an electronic device according to various embodiments will be discussed with reference to the accompanying drawings.

In the following description, the term "Wi-Fi communication status" may denote a status where an electronic device is connected to an access point (AP) to perform Wi-Fi communication. It may also denote a status where the electronic device is connected to an AP to operate in a station mode (STA mode). Here, the term "STA" may denote an electronic device capable of Wi-Fi radio communication.

In the following description, the term "MHS communication status" may denote a status where an electronic device is providing neighboring electronic devices with a mobile hot-spot (MHS) service. It may also denote a status where the electronic device works as an AP to provide the neighboring electronic devices with a radio communication service. The electronic device may act as an AP. In the following description, the expression "MHS communication is turned on" may denote that the electronic device is in the state of acting as an AP.

In the following description, the term "communication coverage" may denote a distance/range in which an electronic device is capable of communicating with neighboring devices. For example, the communication coverage of an AP may be a distance/range in which other electronic devices can connect to the AP. In the following description, the term "communication coverage" may be interchangeably used with "antenna coverage" for the same meaning.

FIG. 1 is a diagram illustrating an exemplary situation where an electronic device uses Wi-Fi and mobile hot spot (MHS) communications simultaneously according to various embodiments of the present disclosure.

In reference to FIG. 1, the electronic device 100 may be in a state of performing Wi-Fi communication in connection to an AP 110 (e.g., sharer). The electronic device 100 may be connected to the AP 110. In the following description, when the electronic device 100 is connected to the AP 110, it may be stated that the electronic device 100 is in a station (STA) mode as denoted by reference number 101. The electronic device 100 may use one of two frequency bands (e.g., 2.4 GHz or 5 GHz) for Wi-Fi communication via the AP 110. The AP 110 may provide the electronic device 100 located within its coverage 130 (e.g., AP antenna coverage) with Wi-Fi communication services. Here, the AP coverage 130 may denote a distance/range in which the electronic device 100 can connect to the AP 110.

According to various embodiments of the present disclosure, the electronic device 100 may be in the state of performing MHS communication with neighboring electronic devices 120. In this state, the electronic device 100 may be providing the neighboring electronic devices 120 with a mobile hotspot service. The electronic device 100 may be in an AP mode as denoted by reference number 103 for providing the neighboring electronic devices 120 with a radio communication service. The neighboring electronic devices 120 may connect to the electronic device 100 in the AP mode 103 for radio communication. In the AP mode, the electronic device 100 may provide the neighboring electronic devices 120 with the MHS service. The electronic device 100 may use one of the two frequency bands for the MHS communication. The electronic device 100 may provide the neighboring electronic device 120 located within its MHS coverage 140 with the MHS communication service. Here, the MHS coverage 140 may denote a distance/range in order for the electronic device 100 to provide the neighboring electronic devices 120 with the MHS communication service.

According to various embodiments of the present disclosure, the electronic device 100 may simultaneously operate in the STA mode as denoted by reference number 101 for Wi-Fi communication and the AP mode as denoted by reference number 103 for MHS communication. According to various embodiments of the present disclosure, the electronic device 100 may perform the MHS communication while performing the Wi-Fi communication in at least one of the two frequency bands (i.e., 2.4 GHz and 5 GHz).

Although the description is directed to a case of using two frequency bands for convenience of explanation, the present disclosure is not limited thereto. The present disclosure may include various embodiments of using three or more frequency bands.

Various embodiments of the present disclosure are directed to exemplary cases of using the Wi-Fi and MHS communications. However, the present disclosure is not limited thereto.

Figure 2A:
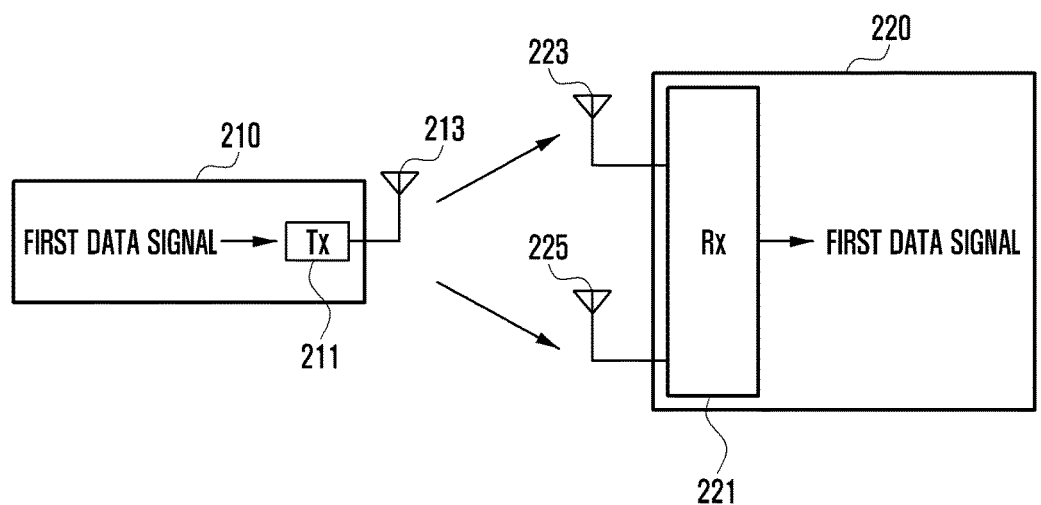
FIGS. 2a and 2b are diagrams illustrating multi-antenna configurations of an electronic device according to various embodiments of the present disclosure.
Figure 2B:
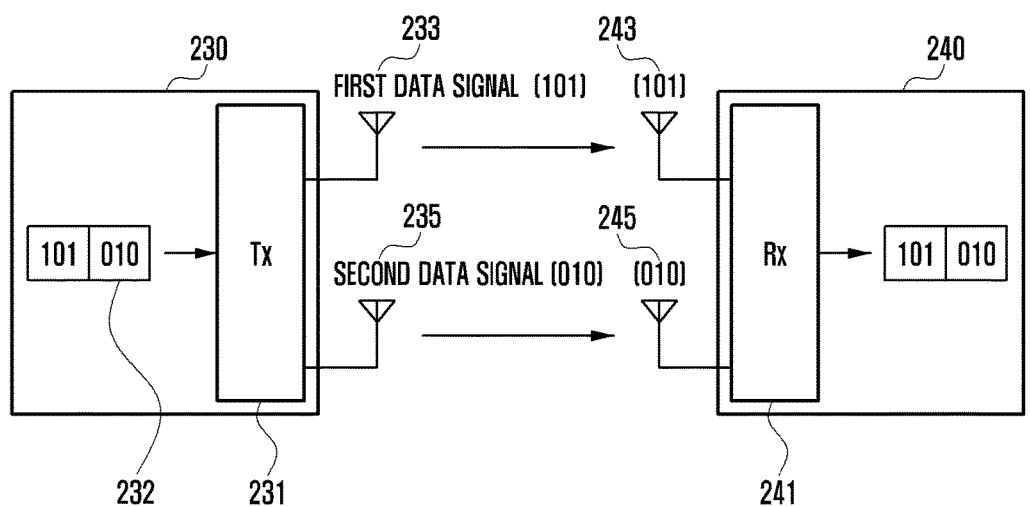

FIGS. 2a and 2b are diagrams illustrating exemplary situations where an electronic device 100 uses multiple antennas according to various embodiments of the present disclosure.

In reference to FIG. 2a, the electronic device 100 may support a multi-antenna based (MIMO) diversity scheme. In the diversity scheme, the electronic device may receive a signal through two or more antennas and combine the signals received through the respective antennas to solve the irregular attenuation effect (e.g., fading) of the received signals. For example, the electronic device 100 may receive the same signal frequency wave with two or more antennas and then combine the antenna outputs to recover the signal.

In reference to FIG. 2a, the first electronic device 210 may transmit a first data signal to the second electronic device 220. The transmitter (Tx) 211 of the first electronic device 210 may transmit the first data signal by means of the transmit antenna 213. Although the drawing shows that the first electronic device 210 transmits the first data signal using one transmit antenna 213, the present disclosure is not limited thereto. The second electronic device 220 may receive the first data signal transmitted by the first electronic device 210 using the first and second receive antennas 223 and 225. The receiver (Rx) 221 of the second electronic device 220 may combine the signals received through the first and second receive antennas 223 and 225 to recover the first data signal. The diversity scheme is characterized by receiving the first data signal with two or more antennas and combining the signals received through the respective antennas to recover the first data signal.

In reference to FIG. 2b, the electronic device 100 may support a multi-antenna based (MIMO) spatial multiplexing scheme. The spatial multiplexing scheme is characterized by transmitting different data signals using multiple spatially separated antennas. In the spatial multiplexing scheme, the different data signals are transmitted through the multiple antennas on a signal frequency so as to increase signal transmission capacity in proportion to the number of transmit antennas.

In reference to FIG. 2b, the first electronic device 230 may transmit data signals 232 to the second electronic device 240. The transmitter (Tx) 231 of the first electronic device 230 may transmit one of the data signals 232, i.e., the first data signal [101], through the first transmit antenna 233 and the other, i.e., the second data signal [010], through the second transmit antenna 235. The first electronic device 230 may transmit two different signals through two antennas. The second electronic device 240 may receive the data signal 232 using the first and second receive antennas 243 and 245. The receiver (Rx) 241 of the second electronic device 240 may receive the first data signal [101] through the first receive antenna 243 and the second data signal [010] through the second receive antenna 245. The spatial multiplexing scheme is capable of increasing the signal transmission capacity by receiving the different data signals through multiple antennas.

According to various embodiments of the present disclosure, if the electronic device 100 receives a request for MHS communication during the Wi-Fi communication, it may determine whether the antennas are configured for the diversity scheme or the spatial multiplexing scheme.

Figure 2C:
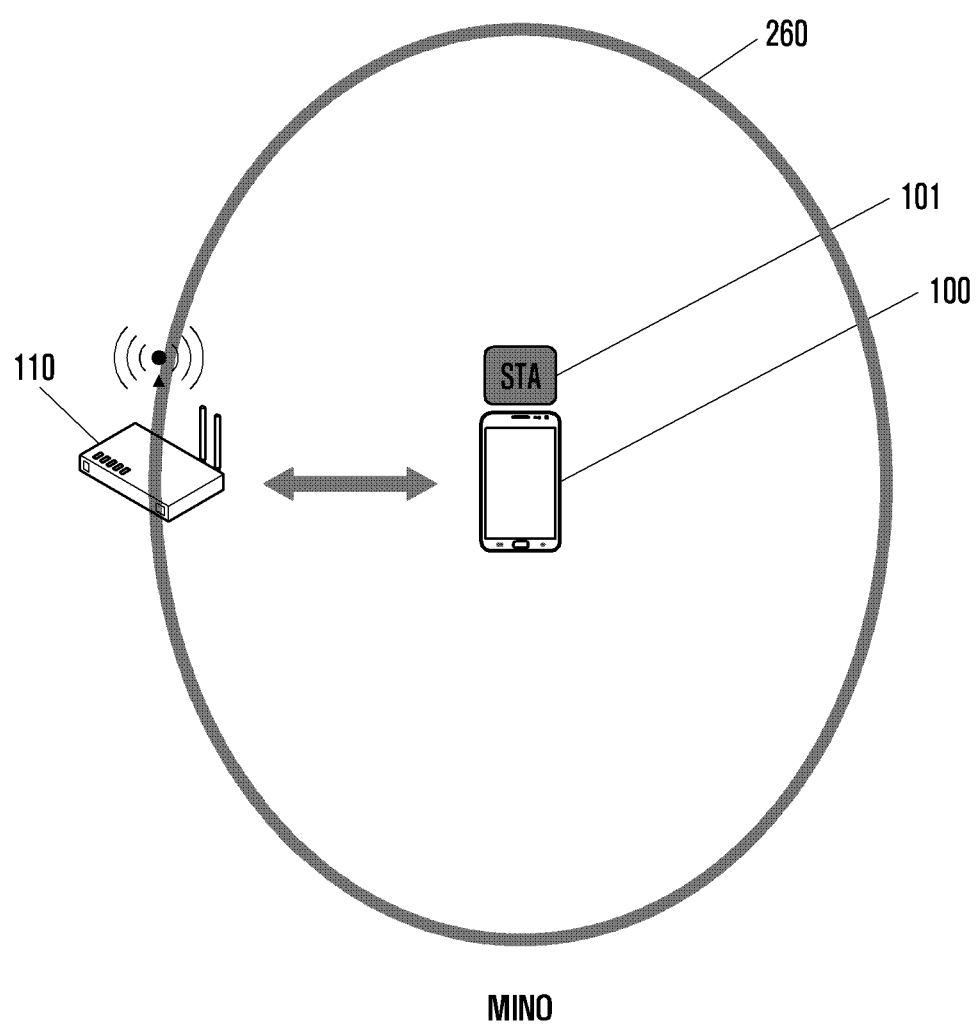
FIGS. 2c and 2d are diagrams illustrating communication coverage of an electronic device in a MIMO mode and a SISO mode, respectively, according to various embodiments of the present disclosure.
Figure 2D:
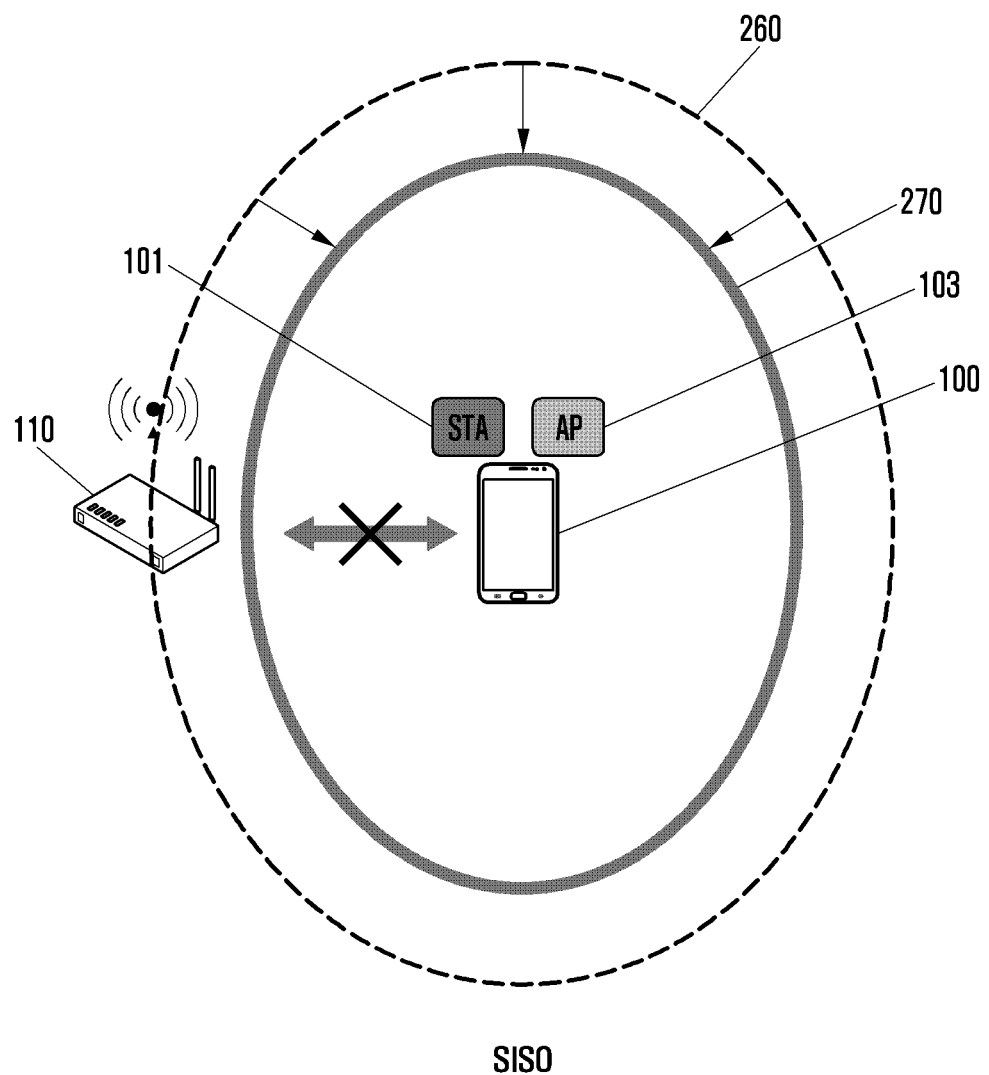

According to various embodiments, the electronic device 100 may switch the antenna operation mode from a MIMO mode to a SISO mode. For example, the electronic device 100 operating in the diversity scheme of the antenna operation mode may switch from the MIMO mode to the SISO mode FIGS. 2c and 2d are diagrams illustrating communication coverage of an electronic device in a MIMO mode and a SISO mode, respectively, according to various embodiments of the present disclosure.

The SISO mode denotes that the antenna system is characterized by single input and signal output. Each of the sending and receiving parts uses a single antenna for transmitting a signal.

The MIMO mode is characterized by multiple inputs and multiple outputs. The sending part uses two or more antennas for transmitting data through multiple paths, and the receiving part uses two or more antennas for receiving signals through the respective paths. The MIMO mode is superior to the SISO mode in data rate and communication distance.

In a comparison between the MIMO and SISO modes, the SISO mode uses one antenna and thus has a coverage smaller than that of the MIMO mode. Since the MIMO mode uses two or more antennas, it has a data rate higher than that of the SIMO mode and a coverage larger than that of the SIMO mode.

FIG. 2c depicts the communication coverage 260 of the electronic device 100 operating in the MIMO mode (e.g., diversity). The electronic device 100 operating in the STA mode as denoted by reference number 101 may connect to the AP 110 located within its first coverage 260 in the MIMO mode (communication coverage in the MIMO mode). According to various embodiments of the present disclosure, the communication coverage of the electronic device 100 in the MIMO mode is larger than that in the SISO mode.

FIG. 2d depicts the communication coverage 270 of the electronic device 100 operating in the SISO mode. The electronic device 100 in the SISO mode may connect to an AP located within the second coverage 270 (communication coverage in the SISO mode). As shown in FIG. 2d, the electronic device 100 cannot connect to the AP 110 because the AP 110 is out of the second coverage 270. For example, if the operation mode is switched from the MIMO mode to the SISO mode, the communication coverage of the electronic device is changed from the first coverage 260 to the second coverage 270 so that the coverage is decreased. The coverage reduction of the electronic device 100 may cause breakdown of a communication link previously established with the AP. According to various embodiments of the present disclosure, the electronic device 100 operating in the SISO mode may establish separate channels by means of respective channels. According to various embodiments of the present disclosure, the electronic device 100 may establish a connection (for operating as an STA as denoted by reference number 101) with the AP in one of two frequency bands and another channel for MHS communication (for operating as an AP as denoted by reference number 103) in the other frequency band.

According to various embodiments of the present disclosure, the electronic device 100 may support multiple antennas. The present disclosure allows an electronic device with a plurality of antennas to establish a connection with a first external device by means of multiple antennas based on a first short-range communication protocol. The present disclosure allows the electronic device to check a connection request for a second short range communication during the connection with the first external device and establish a connection to a second external device by means of at least one of the multiple antennas based on a second short-range communication. The present disclosure allows an electronic device to perform a first short range wireless communication with a first external device by means of multiple antennas and a second short range wireless communication with a second external device by means of at least one of the multiple antennas.

According to various embodiments of the present disclosure, the electronic device 100 may perform Wi-Fi and MHS communications in one of multiple frequency bands.

Figure 3:
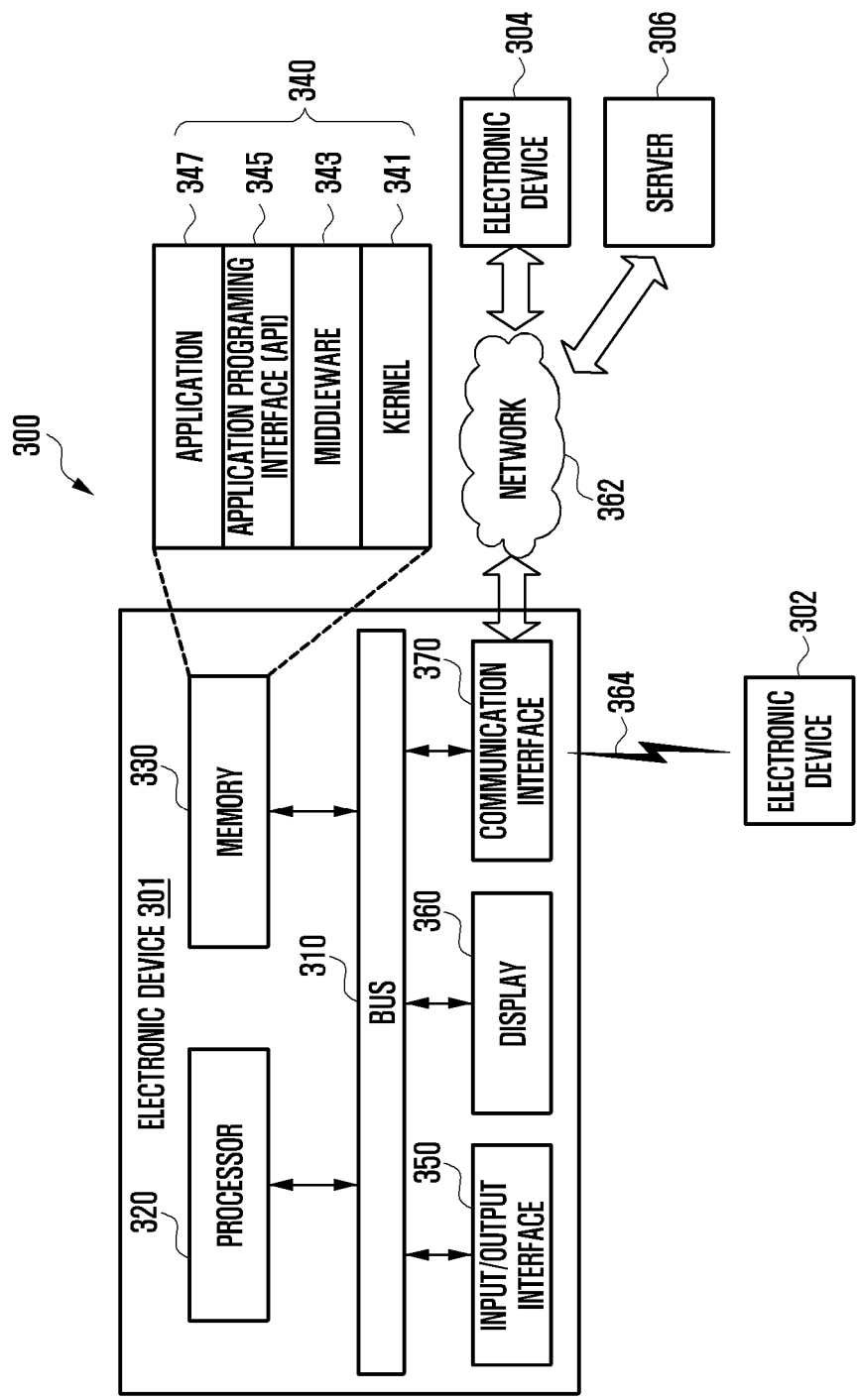
FIG. 3 is a block diagram illustrating a network environment according to various embodiments of the present disclosure.

FIG. 3 illustrates a network environment including an electronic device according to various embodiments of the present disclosure.

Referring to FIG. 3, an electronic device 301 of a network environment 300 may include a bus 310, a processor 320, a memory 330, an input/output interface 350, a display 360, and a communication interface 370. According to some embodiments, at least one of the above described components may be omitted from the electronic device 301 or other components may be included in the electronic device 301.

The bus 310 may be a circuit for connecting the above described components 320, 330, 350, 360, and 370 and transmitting communications (e.g., control messages and/or data) between the above described components.

The processor 320 is capable of including one or more of the following: a CPU, an AP, and a communication processor (CP). The processor 320 is further capable of controlling at least one of the other components of the electronic device 301, and/or processing data or operations related to communications.

The memory 330 is capable of including volatile memory and/or non-volatile memory. The memory 330 is further capable of storing data or commands related to at least one of the other components of the electronic device 301. According to an embodiment, the memory 330 is further capable of storing software and/or a program module 340. For example, the program module 340 is capable of including a kernel 341, middleware 343, an application programming interface (API) 345, application programs (or applications) 347 and the like. The kernel 341, middleware 343 and/or at least part of the API 345 may comprise an operating system (OS).

The kernel 341 is capable of controlling or managing system resources (e.g., the bus 310, processor 320, memory 330 and so forth) used to execute operations or functions of other programs (e.g., the middleware 343, API 345 and application programs 347). The kernel 341 provides an interface capable of allowing the middleware 343, API 345 and application programs 347 to access and control/manage the individual components of the electronic device 301.

The middleware 343 is capable of mediating between the API 345 or application programs 347 and the kernel 341 so that the API 345 or the application programs 347 can communicate with the kernel 341 and exchange data therewith. The middleware 343 is capable of processing one or more task requests received from the application programs 347 according to the priority. For example, the middleware 343 is capable of assigning a priority for use of system resources of the electronic device 301 (e.g., the bus 310, processor 320, memory 330 and so forth) to at least one of the application programs 347. For example, the middleware 343 processes one or more task requests according to a priority assigned to at least one application program, thereby performing scheduling or load balancing for the task requests.

The API 345 refers to an interface configured to allow the application programs 347 to control functions provided by the kernel 341 or the middleware 343. The API 345 is capable of including at least one interface or function (e.g., instructions) for file control, window control, image process, text control or the like.

The input/output interface 350 is capable of transferring instructions or data, received from a user or external devices, to one or more components of the electronic device 301. The input/output interface 350 is also capable of outputting instructions or data, received from one or more components of the electronic device 301, to the user or external devices.

According to various embodiments, the memory 330 of the electronic device 301 may store data received from external device. The memory 330 may store data for distinguishing advertisement contents from contents. For example, the memory 330 may store an advertisement content list corresponding to the advertisement content, or an advertisement blocking list for blocking the advertisement content. According to various embodiments, the memory 330 may store id of the area where the content is located or class information, information on the structure of the whole DOM tree, or URL information corresponding to the content, etc. in order to distinguish the advertisement contents.

The display 360 is capable of including a liquid crystal display (LCD), a flexible display, a transparent display, a light emitting diode (LED) display, an organic LED (OLED) display, micro-electro-mechanical systems (MEMS) display, an electronic paper display and the like. The display 360 is capable of displaying various types of content (e.g., texts, images, videos, icons, symbols and so forth). The display 360 may also be implemented with a touch screen. In this case, the display 360 is capable of receiving touches, gestures, proximity inputs or hovering inputs, via a stylus pen or a user's body.

The communication interface 370 is capable of establishing communication between the electronic device 301 and an external device (e.g., a first electronic device 302, a second electronic device 304, and/or a server 306). For example, the communication interface 370 is capable of communicating with an external device (e.g., the second external device 304 or server 306) connected to a network 362 via wired or wireless communication.

Wireless communication may employ, as a cellular communication protocol, at least one of the following: long-term evolution (LTE), LTE advanced (LTE-A), code division multiple access (CDMA), wideband CDMA (WCDMA), universal mobile telecommunications system (UMTS), wireless broadband (WiBro), global system for mobile communication (GSM) and the like. Wireless communication may also include short-wireless communication 364. Short-wireless communication 364 may include at least one of the following: WiFi, Bluetooth (BT), near field communication (NFC), magnetic secure transmission (MST), global navigation satellite system (GNSS) and the like. The GNSS may include at least one of the following: GPS, global navigation satellite system (Glonass), Beidou navigation satellite system (hereinafter called "Beidou"), and Galileo, a European global satellite-based navigation system, according to GNSS using areas, bandwidths and so forth. In the present disclosure, "GPS" and "GNSS" may be used interchangeably. Wired communication may include at least one of the following: universal serial bus (USB), high definition multimedia interface (HDMI), recommended standard 232 (RS-232), and plain old telephone service (POTS). The network 362 may include at least one of the following: a telecommunications network, e.g., a computer network (e.g., local area network (LAN) or wide area network (WAN)), the Internet, and a telephone network.

The first and second external electronic devices 302 and 304 may be identical to or different from the electronic device 301 in terms of type or otherwise. According to an embodiment, the server 306 is capable of including a group of one or more servers. According to various embodiments, part or all of the operations executed on the electronic device 301 may be executed on another electronic device or a plurality of other electronic devices (e.g., electronic devices 302 and 304 or server 306). According to an embodiment, when the electronic device needs to perform a function or service automatically or according to a request, it may not perform the function or service directly, but is capable of requesting at least part of the function or service from other electronic devices (e.g., electronic devices 302 and 304 or server 306). The other electronic devices (e.g., electronic devices 302 and 304 or server 306) are capable of executing the requested function or additional functions, and transmitting the results to the electronic device 301. The electronic device 301 processes the received results, or further proceeds with additional processes, to provide the requested function or service. To this end, the electronic device 301 may employ cloud computing, distributed computing, or client-server computing technology.

That the electronic device 300 communicates with the first external electronic device 302 through the interface 370 may correspond to the MHS communication in the present disclosure, and that the electronic device 300 communicates with the second external electronic device 304, the server 306, and the network 362 through the interface 370 may correspond to the Wi-Fi communication in the present disclosure.

Figure 4:
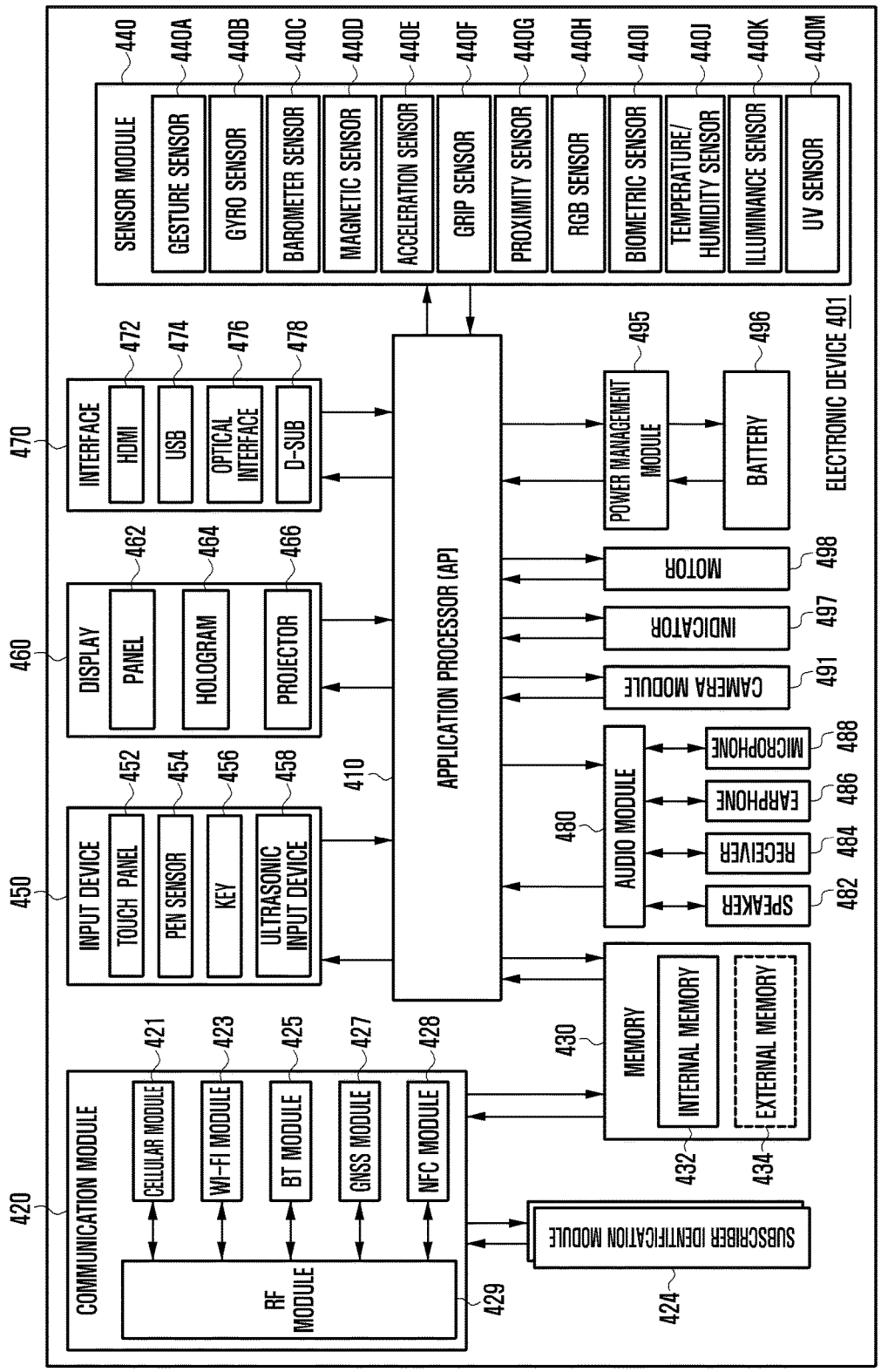
FIG. 4 is a block diagram illustrating a configuration of an electronic device according to various embodiments of the present disclosure.

FIG. 4 is a detailed block diagram showing a configuration of an electronic device according to various embodiments of the present disclosure.

Referring to FIG. 4, an electronic device 401 is capable of including part or all of the components in the electronic device 301 shown in FIG. 3.

The electronic device 401 is capable of including one or more processors 410 (e.g., APs), a communication module 420, a subscriber identification module (SIM) 424, a memory 430, a sensor module 440, an input device 450, a display 460, an interface 470, an audio module 480, a camera module 491, a power management module 495, a battery 496, an indicator 497, and a motor 498.

The processor 410 is capable of driving, for example, an OS or an application program to control a plurality of hardware or software components connected to the processor 410, processing various data, and performing operations. The processor 410 may be implemented as, for example, a system on chip (SoC). According to an embodiment, the processor 410 may further include a graphic processing unit (GPU) and/or an image signal processor (ISP). The processor 410 may also include at least part of the components shown in FIG. 4, e.g., a cellular module 421. The processor 410 is also capable of loading commands or data received from at least one of the other components (e.g., a non-volatile memory) on a volatile memory, and processing the loaded commands or data. The processor 410 is also capable of storing various data in a non-volatile memory.

Although not shown in the drawing, the processor 410 may include a signal strength measurement module and a mode switching determination module. If the electronic device 400 is connected to an AP, the signal strength measurement module may measure the signal strength between the electronic device 400 and the AP. In detail, the signal strength measurement module may measure a received signal strength indicator (RSSI), modulation and coding scheme (MCS), or stream. The RSSI may be a value obtained by digitizing the power strength of the received signal. The MCS may be a value obtained by digitizing the transmit/receive data rate in a Wi-Fi communication mode. The stream may be a value related to data transmission efficiency. According to an embodiment of the present disclosure, the signal strength measurement module may perform measurement to obtain the information on data transmission between the electronic device 400 and the connected AP. In the case that the electronic device 400 is in the MHS communication status, the signal strength measurement module may perform measurement to obtain the information on the data transmission between the electronic device 400 and another electronic device connected thereto. The signal strength measurement module may be implemented in software, hardware, firmware, or a combination thereof.

The mode switching determination module may determine the possibility of switching from the MIMO mode to the SISO mode based on the signal strength measured by the signal strength measurement module. For example, the mode switching determination module may determine whether the communication link of the electronic device 400 previously established with the other electronic device is broken in the case of switching from the MIMO mode to the SISO mode. The mode switching determination module may determine whether to switch from the MIMO mode to the SISO mode by comparing the signal strength measured by the signal strength measurement module and a threshold value stored in the memory 440. The mode switching measurement module may be implemented in software, hardware, firmware, or a combination thereof.

The communication module 420 may include the same or similar configurations as the communication interface 370 shown in FIG. 3. For example, the communication module 370 is capable of including the cellular module 421, a WiFi module 423, a BT module 425, a GNSS module 427 (e.g., a GPS module, Glonass module, Beidou module or Galileo module), an NFC module 428, and a radio frequency (RF) module 429.

The cellular module 421 is capable of providing a voice call, a video call, a short message service (SMS) service, an Internet service and the like, through a communication network, for example. According to an embodiment, the cellular module 421 is capable of identifying and authenticating an electronic device in a communication network by using a SIM (e.g., a SIM card). According to an embodiment, the cellular module 421 is capable of performing at least part of the functions provided by the processor 410. According to an embodiment, the cellular module 421 is also capable of including a CP.

Each of the WiFi module 423, the BT module 425, the GNSS module 427, and the NFC module 428, is capable of including a processor for processing data transmitted or received through the corresponding module. According to various embodiments, at least part of the cellular module 421, WiFi module 423, BT module 425, GNSS module 427, and NFC module 428 (e.g., two or more modules) may be included in one integrated chip (IC) or one IC package.

The RF module 429 is capable of transmission/reception of communication signals, e.g., RF signals. The RF module 429 is capable of including a transceiver, a power amp module (PAM), a frequency filter, a low noise amplifier (LNA), an antenna and the like. According to another embodiment, at least one of the following modules: cellular module 421, WiFi module 423, BT module 425, GNSS module 427, and NFC module 428, is capable of transmission/reception of RF signals through a separate RF module.

The SIM module 424 is capable of including a card including a SIM and/or an embodied SIM. The SIM module 424 is also capable of containing unique identification information, e.g., integrated circuit card identifier (ICCID), or subscriber information, e.g., international mobile subscriber identity (IMSI).

The memory 430 (e.g., memory 330 shown in FIG. 3) is capable of including a built-in or internal memory 432 and/or an external memory 434. The built-in memory 432 is capable of including at least one of the following: a volatile memory, e.g., a dynamic random access memory (DRAM), a static RAM (SRAM), a synchronous dynamic RAM (SDRAM) and the like; and a non-volatile memory, e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory and the like), a hard drive, a solid state drive (SSD) and the like.

The external memory 434 is also capable of including a flash drive, e.g., a compact flash (CF), a secure digital (SD), a micro-SD, a mini-SD, an extreme digital (xD), a multimedia card (MMC), a memory stick and the like. The external memory 434 is also capable of being connected to the electronic device 401, functionally and/or physically, through various interfaces.

The sensor module 440 is capable of measuring/detecting a physical quantity or an operation state of the electronic device 401, and converting the measured or detected information into an electronic signal. The sensor module 440 is capable of including at least one of the following: a gesture sensor 440A, a gyro sensor 440B, an atmospheric pressure sensor 440C, a magnetic sensor 440D, an acceleration sensor 440E, a grip sensor 440F, a proximity sensor 440G, a color sensor 440H (e.g., a red, green, and blue (RGB) sensor), a biometric sensor 440I, a temperature/humidity sensor 440J, an illuminance sensor 440K, and an ultraviolet (UV) sensor 440M. Additionally or alternatively, the sensor module 440 is capable of further including an E-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 440 is capable of further including a control circuit for controlling one or more sensors included therein. In various embodiments, the electronic device 401 is capable of including a processor, configured as part of the processor 410 or as a separate component, for controlling the sensor module 440. In this case, while the processor 410 is operating in sleep mode, the processor is capable of controlling the sensor module 440.

The input device 450 is capable of including a touch panel 452, a (digital) pen sensor 454, a key 456, or an ultrasonic input unit 458. The touch panel 452 may be implemented with at least one of the following: a capacitive touch system, a resistive touch system, an infrared touch system, and an ultrasonic touch system. The touch panel 452 may further include a control circuit. The touch panel 452 may also further include a tactile layer to provide a tactile response to the user.

The (digital) pen sensor 454 may be implemented with a part of the touch panel or with a separate recognition sheet. The key 456 may include a physical button, an optical key, or a keypad. The ultrasonic input unit 458 is capable of detecting ultrasonic waves, created in an input tool, through a microphone 488, and identifying data corresponding to the detected ultrasonic waves.

The display 460 (e.g., the display 360 shown in FIG. 3) is capable of including a panel 462, a hologram unit 464, or a projector 466. The panel 462 may include the same or similar configurations as the display 360 shown in FIG. 3. The panel 462 may be implemented to be flexible, transparent, wearable and/or impact resistant. The panel 462 may also be incorporated into one module together with the touch panel 452. The hologram unit 464 is capable of showing a stereoscopic image in the air by using light interference. The projector 466 is capable of displaying an image by projecting light onto a surface or screen. The screen may be located inside or outside of the electronic device 401. According to an embodiment, the display 460 may further include a control circuit for controlling the panel 462, the hologram unit 464, or the projector 266.

The interface 470 is capable of including a HDMI 472, a USB 474, an optical interface 476, or a D-subminiature (D-sub) 478. The interface 470 may be included in the communication interface 370 shown in FIG. 3. Additionally or alternatively, the interface 470 is capable of including a mobile high-definition link (MHL) interface, an SD card/MMC interface, or an infrared data association (IrDA) standard interface.

The audio module 480 is capable of providing bidirectional conversion between a sound and an electronic signal. At least part of the components in the audio module 480 may be included in the input/output interface 350 shown in FIG. 3. The audio module 480 is capable of processing sound information input or output through a speaker 482, a receiver 484, earphones 486, or microphone 488.

The camera module 491 refers to a device capable of taking both still and moving images. According to an embodiment, the camera module 491 is capable of including one or more image sensors (e.g., a front image sensor or a rear image sensor), a lens, an ISP, a flash (e.g., an LED or xenon lamp) and the like.

The power management module 495 is capable of managing power of the electronic device 401. According to an embodiment, the power management module 495 is capable of including a power management integrated circuit (PMIC), a charger IC, or a battery or fuel gauge. The PMIC may employ wired charging and/or wireless charging methods. Examples of the wireless charging method are magnetic resonance charging, magnetic induction charging, electromagnetic charging and acoustic charging. To this end, the PIMC may further include an additional circuit for wireless charging, such as a coil loop, a resonance circuit, a rectifier and the like. The battery gauge is capable of measuring the residual capacity, charge in voltage, current, or temperature of the battery 496. The battery 496 may take the form of either a rechargeable battery or a solar battery, but embodiments are not limited thereto.

The indicator 497 is capable of displaying a specific status of the electronic device 401 or a part thereof (e.g., the processor 410), e.g., a boot-up status, a message status, a charging status and the like. The motor 498 is capable of converting an electrical signal into mechanical vibrations, such as a vibration effect, a haptic effect and the like. Although not shown, the electronic device 401 is capable of further including a processing unit (e.g., GPU) for supporting a mobile TV. The processing unit for supporting a mobile TV is capable of processing media data pursuant to applicable standards, e.g., digital multimedia broadcasting (DMB), digital video broadcasting (DVB), mediaFlo™ and the like.

Figure 5A:
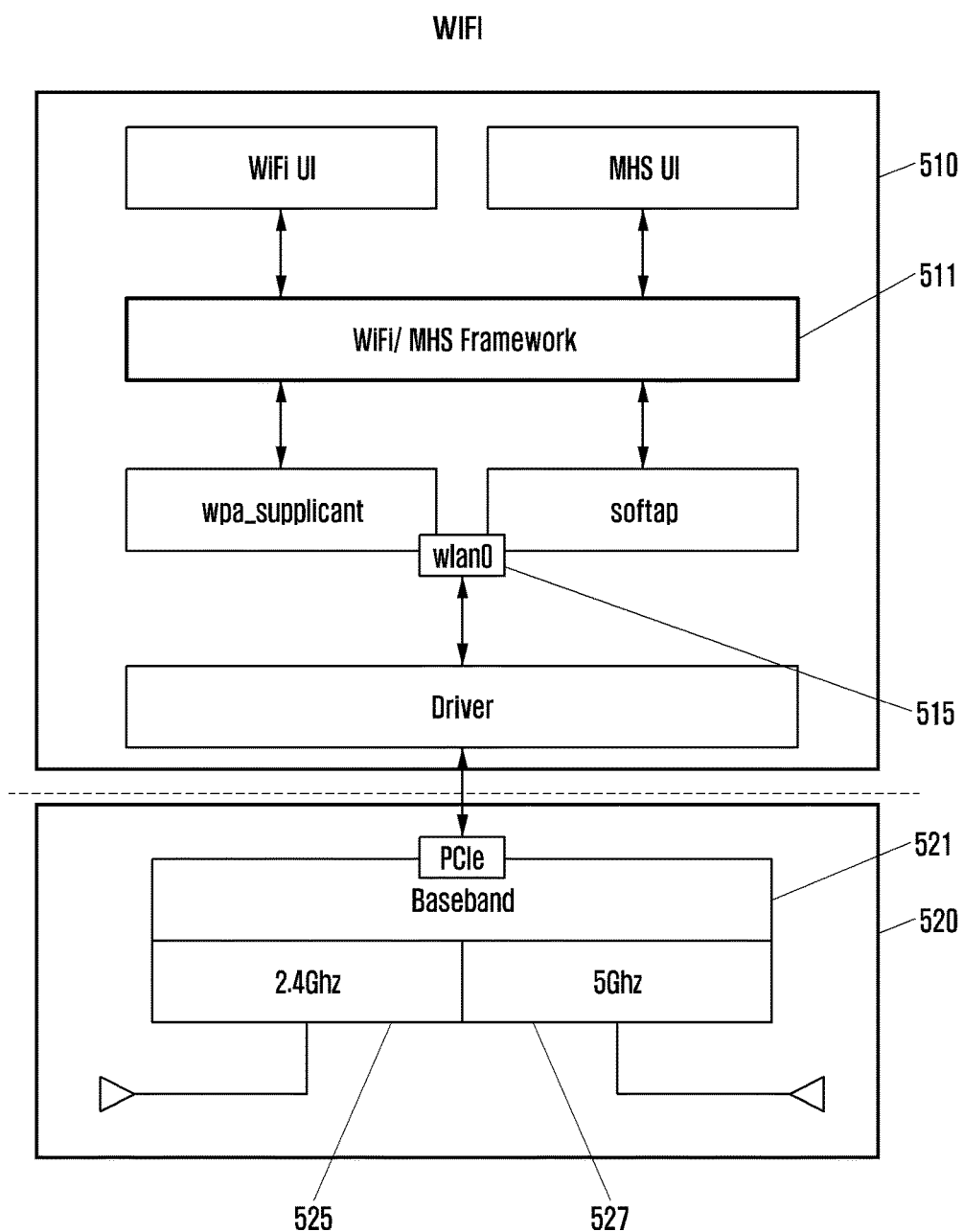
FIG. 5a is a diagram illustrating a configuration of an electronic device using a single frequency band according to various embodiments of the present disclosure.

FIG. 5a is a diagram illustrating a configuration of an electronic device using a single frequency band according to various embodiments of the present disclosure.

In reference to FIG. 5a, a Wi-Fi structure (using a frequency band) may be composed of an AP layer 510 and a Wi-Fi chip layer 520.

The AP layer 510 may include a Wi-Fi user interface (UI), a MHS UI, and a Wi-Fi/MHS framework 511 communicating with the Wi-Fi UI and MHS UI. The Wi-Fi UI may be a component for Wi-Fi communication of the electronic device, and the MHS UI may be a component for MHS communication of the electronic device. The electronic device may determine whether to operate for Wi-Fi communication or MHS communication by means of the Wi-Fi/MHS frame work 511. The AP layer 510 may include wpa_supplicant and softap that are responsible for Wi-Fi connection authentication of the electronic device. The wpa_supplicant and softap may be managed as a single wireless LAN called wlan0 515. The AP layer 510 includes a driver for communication with the Wi-Fi chip layer 520.

The Wi-Fi chip layer 520 may communicate with the driver of the AP layer 510 through a peripheral component interconnect express (PCIe) and use a baseband 521. The Wi-Fi chip layer 520 may perform communication using one of two frequency bands: 2.4 GHz frequency band 525 and 5 GHz frequency band 527 in response to a request of a user or an application.

The electronic device with the legacy Wi-Fi structure may perform one of Wi-Fi communication and MHS communication in one of the 2.4 GHz frequency band 525 and the 5 GHz frequency band 527. The electronic device with the legacy Wi-Fi structure may use one of the wpa_supplicant and softap as a wireless LAN (e.g., wlan0 515 because it cannot perform the Wi-Fi and MHS communications simultaneously.

Figure 5B:
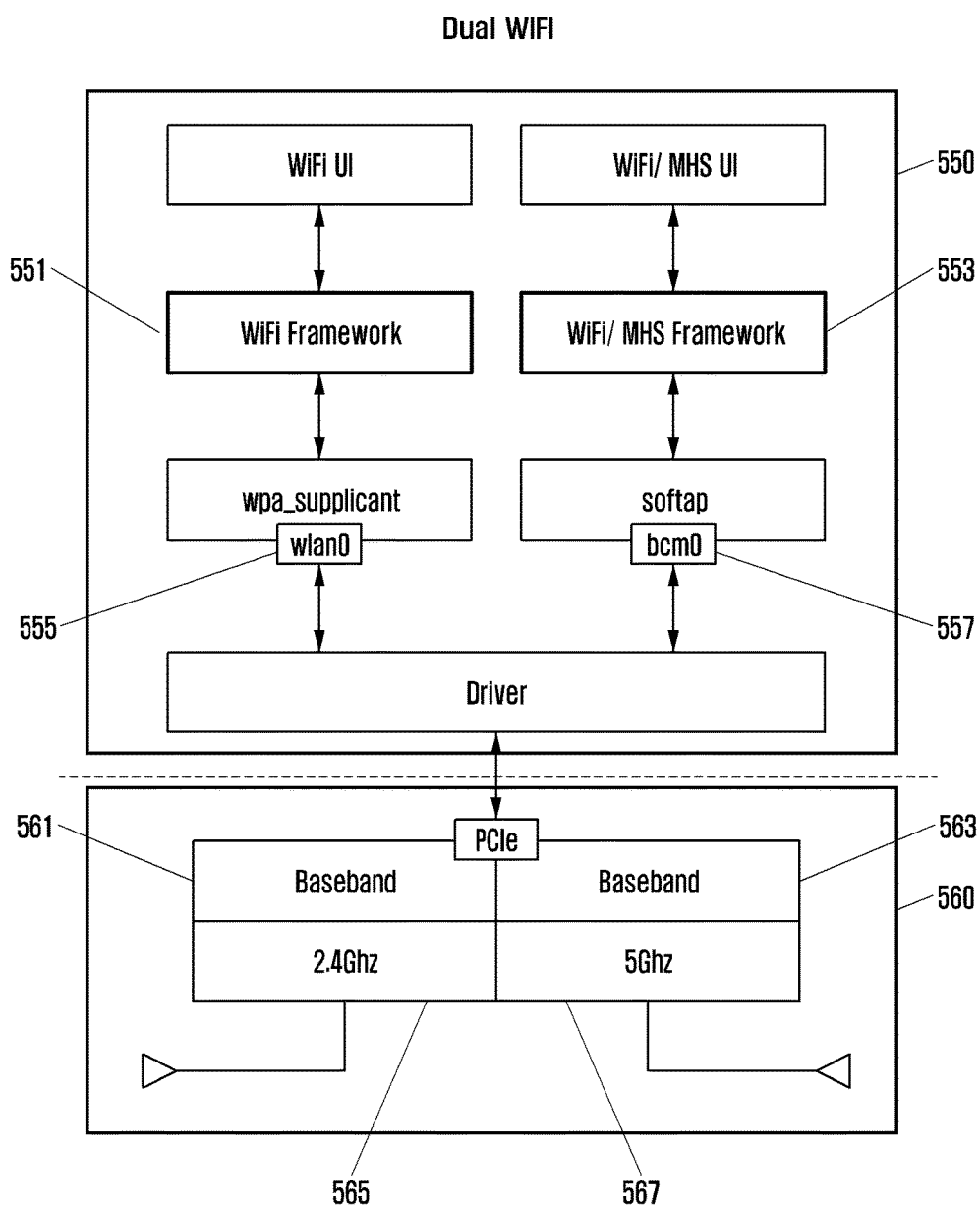
FIG. 5b is a diagram illustrating a configuration of an electronic device capable of using two types of short range wireless communication according to various embodiments of the present disclosure.

FIG. 5b is a diagram illustrating a configuration of an electronic device capable of using two types of short range wireless communication according to various embodiments of the present disclosure.

In reference to FIG. 5b, the electronic device may support two short range wireless communication modes in two available frequency bands (e.g., 2.4 GHz and 5 GHz). In the following description, the communication scheme of using the two short-range wireless communication modes is referred to as Dual Wi-Fi.

For Dual Wi-Fi, the electronic device may include a AP layer 550 and a Wi-Fi chip layer 560 like the Wi-Fi structure of FIG. 5a.

The AP layer 550 may include a Wi-Fi UI and a Wi-Fi/MHS UI. The AP layer 550 may include a Wi-Fi framework 551 for communication with the Wi-Fi UI and a Wi-Fi/MHS framework 553 for communication with the Wi-Fi/MHS UI. The AP layer 550 may include wpa_supplicant and softap that are responsible for Wi-Fi connection authentication of the electronic device. In the dual Wi-Fi mode, the wpa_supplicant may be managed as a wireless LAN called wlan0 555, and the softap may be managed as a wireless LAN called bcm0 557. In the dual Wi-Fi mode, the AP layer 550 may use the Wi-Fi UI and Wi-Fi/MHS UI individually. The AP layer 550 may include a driver for communication with the Wi-Fi chip layer 560.

The Wi-Fi chip layer 560 may communicate with the driver of the AP layer 550 through a PCIe and use two basebands 561 and 563. In the dual Wi-Fi mode, the Wi-Fi chip layer 560 may use the two basebands 561 and 563 for the two respective Wi-Fi frequency bands (e.g., 2.4 GHz frequency band 565 and 5 GHz frequency band 567). For example, the Wi-Fi chip layer 560 may perform a short range wireless communication in the 2.4 GHZ frequency band 565 and another short range wireless communication in the 5 GHz frequency band 567, in response to requests of a user or an application.

According to various embodiments of the present disclosure, the electronic device may perform the Wi-Fi communication and MHS communication simultaneously using two frequency bands (e.g. 2.4 GHz frequency band 565 and 5 GHz frequency band 567, respectively), in the dual Wi-Fi mode. For example, the electronic device may perform the Wi-Fi communication in the 2.4 GHz frequency band 565 and the MHS communication in the 5 GHz frequency band 567. According to various embodiments of the present disclosure, the electronic device may use the 2.4 GHz frequency band-based Wi-Fi communication to provide other electronic devices with the 5 GHz frequency band-based MHS communication service. The electronic device operating in the dual Wi-Fi mode may perform the Wi-Fi communication in the 2.4 GHz frequency band 565 and the MHS communication in the 5 GHz frequency band 567 because it uses wlan0 555 supporting wpa_supplicant and bcm0 557 supporting softap. The electronic device may perform the two short range communications (Wi-Fi communication and MHS communication).

Figure 6A:
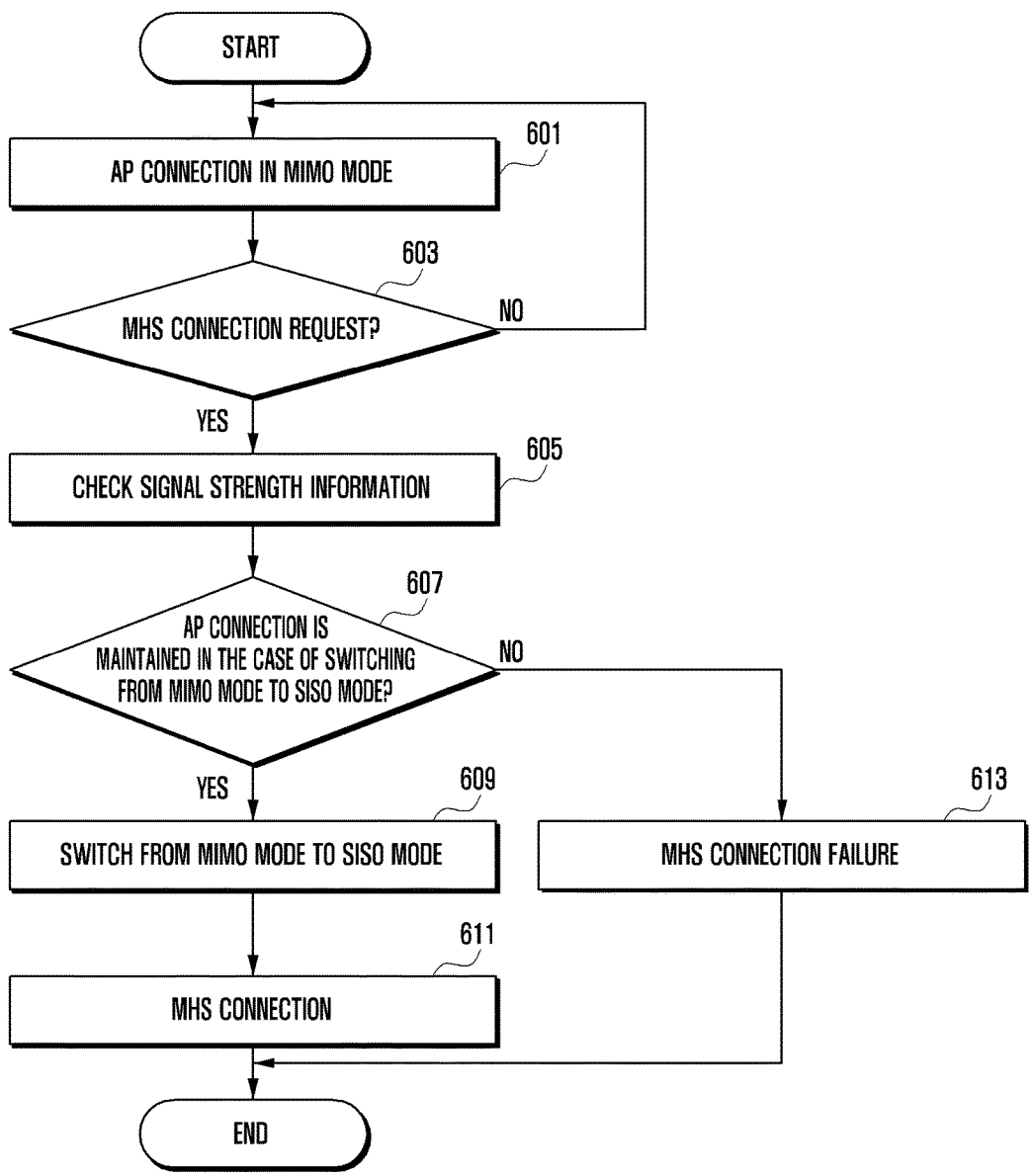
FIG. 6a is a flowchart illustrating a method for supporting MHS communication while maintaining a connection with an AP in the case of performing the MHS communication in the state of being connected to the AP according to various embodiments of the present disclosure.

FIG. 6a is a flowchart illustrating a method for supporting MHS communication while maintaining a connection with an AP in the case of performing the MHS communication in the state of being connected to the AP according to various embodiments of the present disclosure.

In reference to FIG. 6a, the processor 410 of the electronic device 400 may be connected to the AP through a first short range wireless communication in a MIMO mode at step 601. For example, the processor 410 may connect to a neighboring AP in a MIMO mode in two available frequency bands (e.g., 2.4 GHz and 5 GHz). The electronic device 400 may operate in the STA mode.

At step 603, the processor 410 may check for a MHS connection request through a second short range wireless communication. The MHS connection request may be an arbitrary request of a user or a request generated according to execution of a predetermined application. If it is determined at step 603 that there is no MHS connection request, the processor 410 may maintain the connection to the AP in the MIMO mode. If it is determined at step 603 that there is an MHS connection request, the processor 410 may check signal strength information (e.g., status information) at step 605. For example, the signal strength information may be the information on a data rate or a signal reception rate between the electronic device and the AP in the Wi-Fi communication state. The signal strength information may be an RSSI, MCS, or stream value. The RSSI may be a value obtained by digitizing the power strength of the received signal. The MCS may be a value obtained by digitizing the transmit/receive data rate in a Wi-Fi communication mode. The signal strength information may be the information on data transmission between the electronic device 400 and the AP. The signal strength information may be measured by a signal strength measurement module (not shown) included in the processor 410.

At step 607, the processor 410 of the electronic device 400 may determine whether the AP connection of step 601 is maintained in switching from the MIMO mode to the SISO mode. For example, the processor 410 may determine whether the connection to the AP is maintained based on the signal strength information checked at step 605. According to various embodiments of the present disclosure, the electronic device 400 may have a threshold value about the signal strength information, the threshold value being previously stored in the memory 440. According to various embodiments of the present disclosure, the electronic device 400 may receive the signal strength information through a network. The processor 410 of the electronic device 400 may determine that the connection to the AP may be broken when a value related to the signal strength value is less than the threshold value. At step 607, the processor 410 may determine whether the connection to the AP is maintained in switching from the MIMO mode to the SISO mode based on the checked signal strength information. For example, the electronic device 400 (e.g., mode switching determination module) may determine whether to switch from the MIMO mode to the SISO mode based on the signal strength information.

At step 609, the processor may switch from the MIMO mode to the SISO mode. At step 611, the processor 410 may establish MHS communication with the neighboring electronic device(s). According to an embodiment of the present disclosure, the processor 410 uses one of the two available frequency bands for connection (communication) with the AP and the other for MHS communication in the SISO mode at step 611. According to an embodiment of the present disclosure, the processor 410 may use at least one of multiple antennas for connection (communication) with the AP and at least one other antenna for MHS communication in the SISO mode at step 611.

If it is determined that the AP connection is broken in switching from the MIMO mode to the SISO mode at step 607, at step 613 the processor 410 may not establish any MHS communication. Although not shown in the drawing, if it is determined at step 607 that the AP connection is likely to be broken, the processor 410 may display a notification window on the display 430 for determining whether to establish an MHS communication link. The processor 410 may display a notification window presenting a recommendation for switching to LTE MHS or MHS communication connection setting information to the user. The LTE MHS may denote LTE-based MHS communication rather than Wi-Fi-based MHS communication.

According to various embodiments of the present disclosure, it is possible to check for a connection request for a second short range wireless communication (e.g., MHS communication) in the state of being connected to a first external device (e.g. AP, sharer) through a first short range wireless communication (e.g., Wi-Fi communication). The electronic device may check the wireless communication information related to the first external device. If the wireless communication information fulfils a predetermined condition (condition that the first short range wireless communication is not broken even when the second short range wireless communication is established), the electronic device may establish a connection with a second external device (another electronic device) through the second short range wireless communication. The wireless communication method according to various embodiments of the present disclosure is capable of performing the second short range wireless communication without breakage of the first short range wireless communication when a connection request for the second short range wireless communication is received in the course of the first short range wireless communication.

Figure 6B:
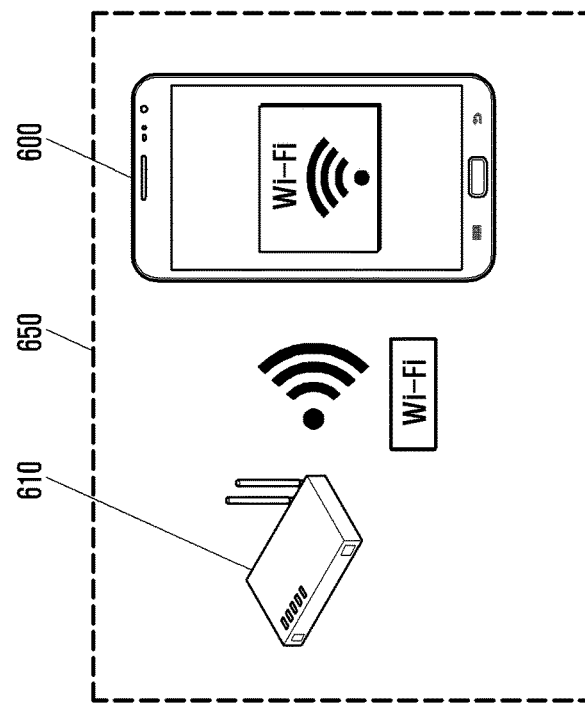
FIG. 6b is a diagram illustrating a procedure for supporting MHS communication while maintaining a connection with an AP in the case of performing the MHS communication in the state of being connected to the AP according to various embodiments of the present disclosure.
Figure 6B:
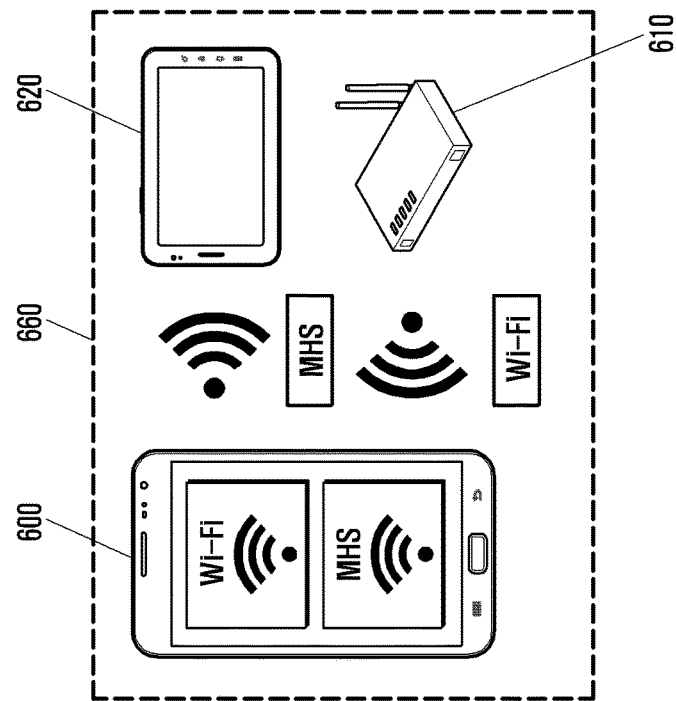

FIG. 6b is a diagram illustrating a procedure for supporting MHS communication while maintaining a connection with an AP in the case of performing the MHS communication in the state of being connected to the AP according to various embodiments of the present disclosure.

In reference to FIG. 6b, the electronic device 600 (electronic device 100 of FIG. 1) may be connected to the AP 610 (AP 110 of FIG. 1) in the Wi-Fi communication status as denoted by reference number 650. For example, the electronic device 600 may connect to the AP in a MIMO mode in two available frequency bands (e.g., 2.4 GHz and 5 GHz). The electronic device 600 may be operating in the STA mode in the Wi-Fi communication status as denoted by reference number 650. The electronic device 600 may have a MIMO communication coverage larger than the SISO mode communication coverage.

Although not shown in the drawing, the electronic device 600 according to various embodiments of the present disclosure may check for signal strength of the AP 610 upon detection of a request for MHS communication. For example, the electronic device 600 may perform measurement to obtain an RSSI value, MCS value, stream value, or the like in association with the AP 610 and determine the signal strength of the AP 610 based on the measurement value. The electronic device 600 may activate the MHS communication when it is determined that the connection to the AP 610 is likely to be maintained based on the signal strength.

If the MHS communication is on in the Wi-Fi communication status as denoted by reference number 650, the electronic device 600 may perform the Wi-Fi and MHS communications simultaneously. For example, the Wi-Fi and MHS communications status as denoted by reference number 660 is the status in which the electronic device 600 is connected to the AP 610 for Wi-Fi communication and simultaneously to another electronic device 620 to provide MHS communication. According to an embodiment of the present disclosure, the electronic device 600 may be in the SISO mode in the Wi-Fi and MHS communications status as denoted by reference number 660. For example, the electronic device 600 may connect to the AP 610 in one of the two available frequency bands for Wi-Fi communication and another electronic device 620 in the other available frequency band for MHS communication in the Wi-Fi and MHS communications status as denoted by reference number 660. The electronic device 600 may perform the Wi-Fi and MHS communications as denoted by reference number 660 in the same frequency band.

According to various embodiments of the present disclosure, the electronic device 600 may transmit data received through MHS communication to the network through Wi-Fi communication in the simultaneous Wi-Fi and MHS communications status as denoted by reference number 660. For example, it may be possible to transmit the data received from another electronic device 620 through MHS communication to the AP 610 through Wi-Fi communication.

Figure 7:
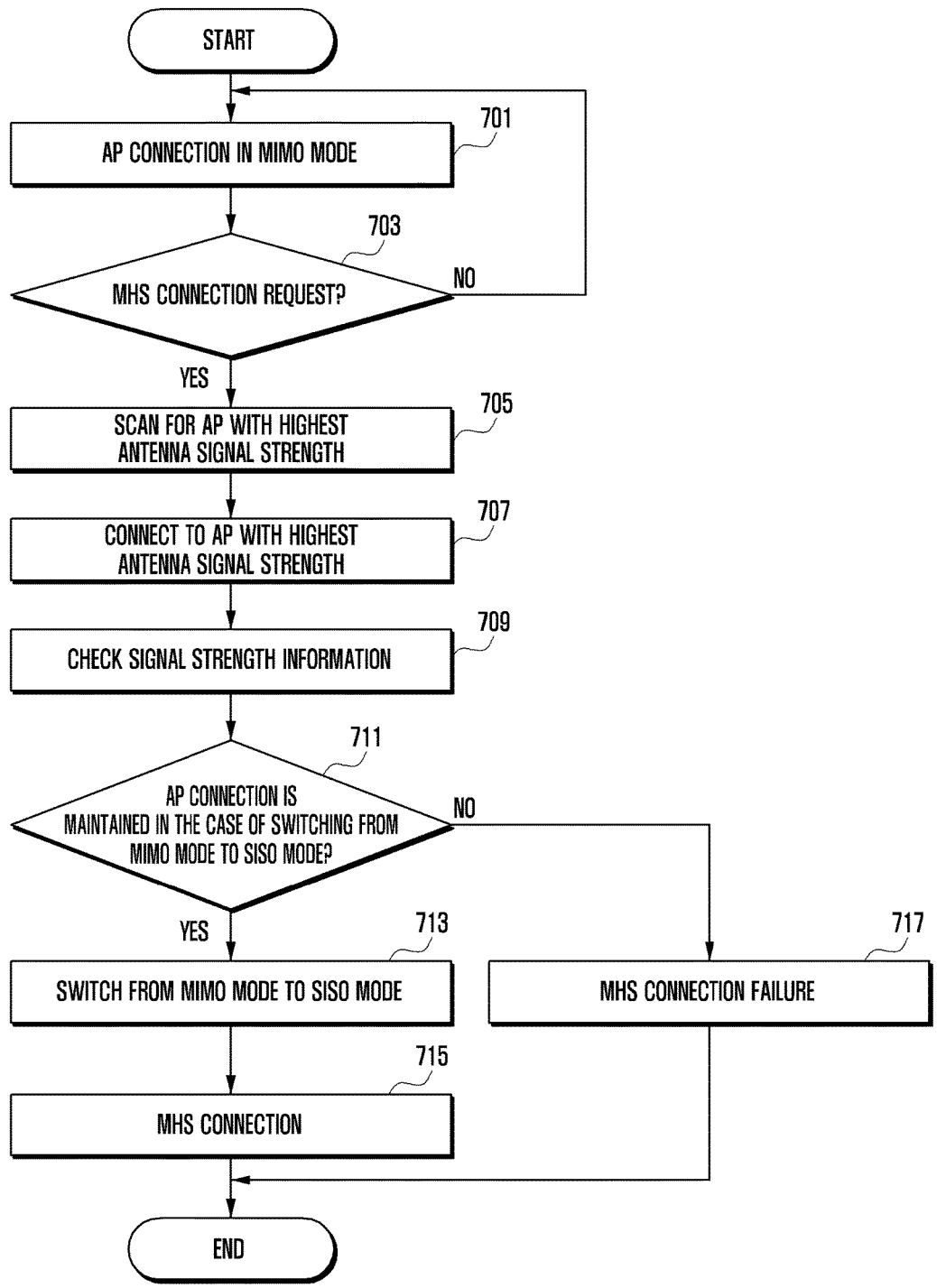
FIG. 7 is a flowchart illustrating a method for supporting MHS communication after connecting to an AP with the highest antenna signal strength for maintaining an AP connection in the case of performing the MHS communication in the state of being connected to the AP according to various embodiments of the present disclosure.

FIG. 7 is a flowchart illustrating a method for supporting MHS communication after connecting to an AP with the highest antenna signal strength for maintaining an AP connection in the case of performing the MHS communication in the state of being connected to the AP according to various embodiments of the present disclosure.

In reference to FIG. 7, the processor 401 of the electronic device 400 may be in a state of being connected to the AP in a MIMO mode at step 701. Although not shown in the drawing, the electronic device 400 (e.g., processor 410) may measure the antenna signal strength of a connectable AP continuously and maintain the connection to the AP with the highest antenna signal strength. The electronic device 400 operating in a MIMO mode supporting two available frequency bands (e.g., 2.4 GHz and 5 GHz) may be connected to the AP with the highest antenna signal strength among connectable neighboring APs, and may be performing Wi-Fi communication.

At step 703, the electronic device 400 (e.g., processor 410) may determine whether an MHS connection is requested. The MHS connection request may be an arbitrary request of a user or a request generated according to execution of a predetermined application. If it is determined at step 703 that there is no MHS connection request, the electronic device 400 (processor 410) may maintain the connection to the AP in the MIMO mode. If it is determined at step 703 that there is a MI-IS connection request, the processor 410 may, at step 705, scan for the AP (e.g., sharer) with the highest antenna signal strength. For example, the electronic device 400 (e.g., processor 410) may scan for the AP with the highest antenna signal strength among the connectable neighboring APs. If an AP has the highest antenna signal strength, this may mean that data transmission between the AP and the electronic device 400 is stable.

At step 707, the electronic device 400 (e.g., processor 410) may connect to the AP with the highest antenna signal strength. If the currently connected AP has the highest antenna signal strength, the electronic device 400 may maintain the connection to the currently connected AP. At step 709, the electronic device 400 may check signal strength-related information (e.g., status information). Operations of steps 709 to 717 may be identical of the operations of steps 605 to 613 of FIG. 6a. Thus, the detailed descriptions of steps 709 to 717 are replaced by those of steps 605 to 613 of FIG. 6a.

Figure 8A:
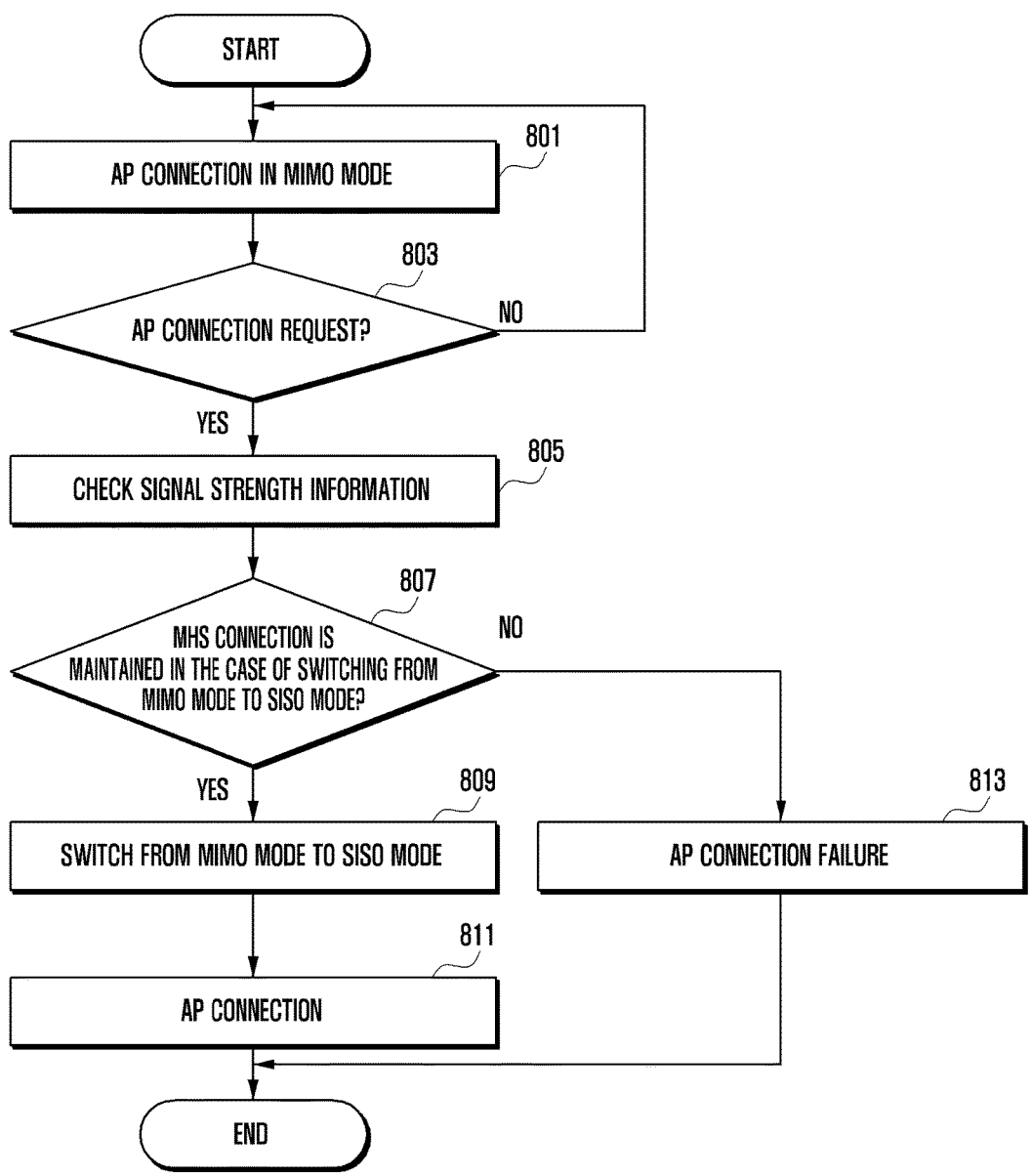
FIG. 8a is a flowchart for explaining a method for supporting an AP connection while maintaining MHS communication in the case where there is an AP connection request in the course of the MHS communication according to various embodiments of the present disclosure.

FIG. 8a is a flowchart for explaining a method for supporting an AP connection while maintaining MHS communication in the case where there is an AP connection request in the course of the MHS communication according to various embodiments of the present disclosure.

In reference to FIG. 8a, the processor 410 of the electronic device 400 may be performing MHS communication in a MIMO mode at step 801. For example, the processor 410 may be providing a neighboring electronic device(s) with the MHS service in the MIMO mode supporting two available frequency bands (e.g., 2.4 GHz and 5 GHz). For example, the electronic device 400 may act as an AP.

At step 803, the processor 410 may determine whether there is an AP connection request. The AP connection request may be an arbitrary request of a user or a request generated according to execution of a predetermined application. If it is determined at step 803 that there is no AP connection request, the processor 410 may maintain the MHS connection status in the MIMO mode. If it is determined at step 803 that there is an AP connection request, the processor 410 may check signal strength information at step 805. For example, the signal strength information may be the information on data transmission between the electronic device and any other electronic device in the MHS communication status. The signal strength information may be obtained through a measurement operation of a signal strength measurement module included in the processor 410. Although not shown in the drawing, if the electronic device 400 provides other multiple electronic devices with the MHS service, the processor 410 of the electronic device 400 may check the signal strength information per electronic device.

The processor 410 of the electronic device 400 may determine at step 807 whether the previously established MHS communication is maintained in the case of switching from the MIMO mode to the SISO mode. According to various embodiments of the present disclosure, the electronic device may have a threshold value about the signal strength information, the threshold value being previously stored in the memory 440. At step 805, the processor 410 may compare a measurement value corresponding to the checked signal strength information with the threshold value. If the measurement value corresponding to the checked signal strength information is less than the threshold value at step 805, the processor 410 may predict at step 807 that the previously connected MHS communication is likely to be broken. At step 807, the processor 410 may determine whether the MHS communication with the other electronic devices is maintained in the case of switching from the MIMO mode to the SISO mode based on the checked signal strength information. Switching from the MIMO mode to the SISO mode may be determined by a mode switching determination module (not shown) included in the processor 410.

If it is determined at step 807 that the MHS connection is maintained in the case of switching from the MIMO mode to the SISO mode, the processor 410 may switch from the MIMO mode to the SISO mode at step 809. At step 811, the processor 410 may connect to the AP for Wi-Fi communication. In detail, the processor 410 may use one of the two available frequency bands for MHS communication and the other for connection to the AP in the SISO mode at step 811. According to various embodiments of the present disclosure, the electronic device 400 may provide a Wi-Fi communication-based MHS service. In this case, there may be a change of the MIMO mode. For example, mode switching may occur from a 4-antenna MIMO mode to a 2-antenna MIMO mode while maintaining the previously established connection.

If it is determined at step 807 that the MHS communication is broken in the case of switching from the MIMO mode to the SISO mode, the processor 410 may not establish any connection to the AP at step 813. Although now shown in the drawing, if it is determined at step 807 that the MHS communication is likely to be broken, the processor 410 may display a notification window on the display 430 for determining whether to establish a connection to the AP. The processor 410 may display a notification window presenting a recommendation for maintaining the MHS communication or Wi-Fi communication settings information to the user.

Figure 8B:
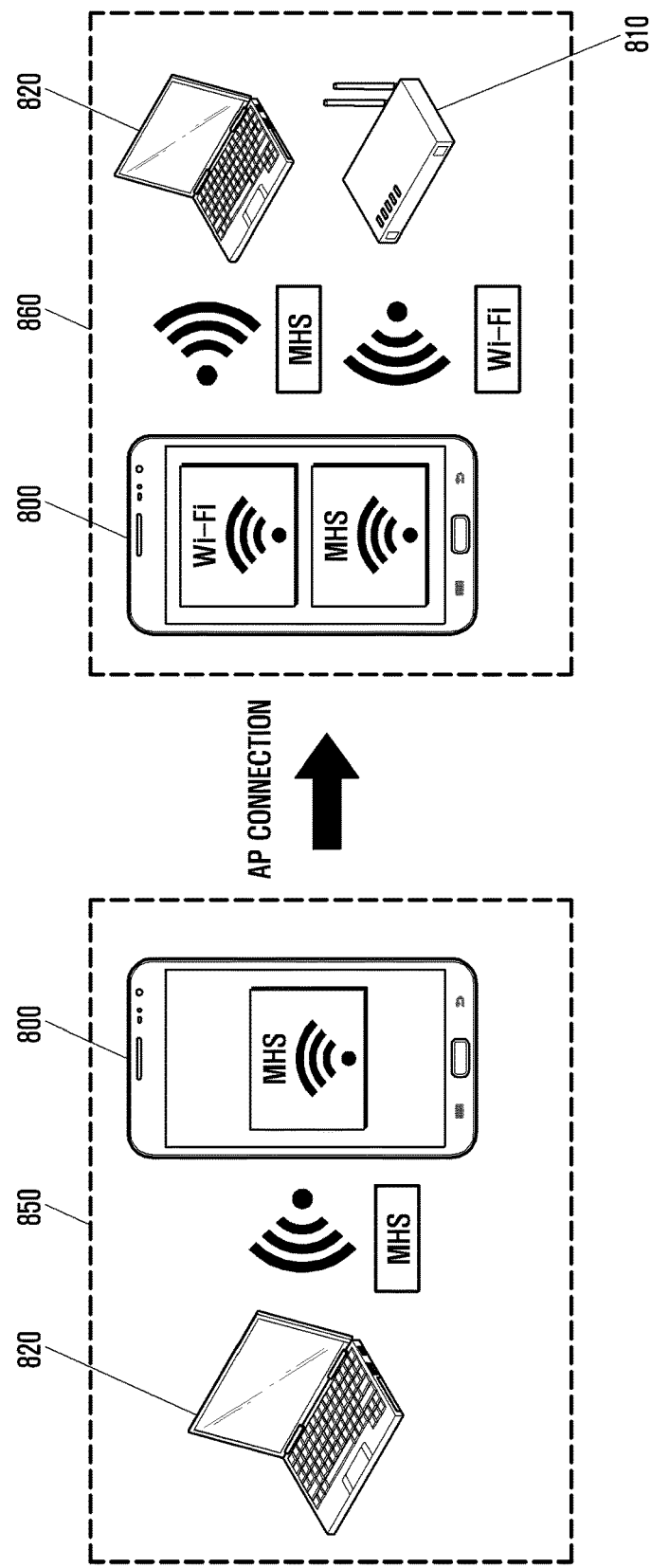
FIG. 8b is a diagram exemplifying a procedure for supporting an AP connection while maintaining MHS communication when there is an AP connection request in the course of the MHS communication according to various embodiments of the present disclosure.

FIG. 8b is a diagram exemplifying a procedure for supporting an AP connection while maintaining MHS communication when there is an AP connection request in the course of the MHS communication according to various embodiments of the present disclosure.

In reference to FIG. 8b, the electronic device 800 (electronic device 100 of FIG. 1) in the MHS communication status as denoted by reference number 850 may perform MHS communication with another electronic device 820 (electronic device 120 of FIG. 1). Although FIG. 8b depicts a laptop as another electronic device 820, the electronic device is not limited to a laptop. The electronic device 800 may perform the MHS communication in the MIMO mode in two frequency bands (e.g., 2.4 GHz and 5 GHz). In the MHS communication status as denoted by reference number 850, the electronic device 800 may act as an AP. The electronic device 800 operating in the MIMO mode may provide the neighboring electronic device(s) 820 with the MHS service.

Although not shown in the drawing, according to various embodiments of the present disclosure, the electronic device 800 may check for the signal strength of the other electronic device 820 when there is an AP connection request for Wi-Fi communication in the course of the MHS communication.

For example, the electronic device 800 may measure an RSSI value, MCS value, stream value, or the like of the other electronic device 820 and check the signal strength of the other electronic device 820 based on the measured value. The electronic device 800 may maintain the connection to the AP while maintaining the MHS communication with the other electronic device 820.

According to various embodiments of the present disclosure, the electronic device 800 connected to the AP in the MHS communication status as denoted by reference number 850 may be in a simultaneous Wi-Fi and MHS communications status as denoted by reference number 860. For example, the electronic device 800 may be performing Wi-Fi communication with the AP 810 in the course of the MHS communication with the other electronic device 820. At this time, the electronic device 800 may be in the SISO mode. The electronic device 800 may perform the MHS communication with the other electronic device 820 in one of the two available frequency bands and Wi-Fi communication via the AP 810 in the other frequency band. The electronic device 800 may perform different types of short-range wireless communication in two different frequency bands. According to various embodiments of the present disclosure, the electronic device 400 may provide a Wi-Fi communication-based MHS service to solve the billing problem related to the MHS service provision. The electronic device 400 may connect to the AP for Wi-Fi communication while maintaining the previously established MHS communication. The electronic device 400 may perform a Wi-Fi communication-based MHS communication.

According to various embodiments of the present disclosure, the electronic device may support multiple antennas. The present disclosure makes it possible to connect to a first external device based on a first short range wireless communication protocol using multiple supportable antennas. The present disclosure may check for a connection request for a second short range wireless communication in the course of being connected to a first external device and check status information (e.g., wireless communication-related information) at least based on the check result. The present disclosure makes it possible to connect to a second electronic device based on a second short range wireless communication protocol-using at least one of the multiple antennas when the status information fulfils a predetermined condition. The present disclosure makes it possible to perform a first short range wireless communication with a first external electronic device using multiple antennas and a second short range wireless communication with a second external device using at least one of the multiple antennas.

According to various embodiments of the present disclosure, at least part of the devices (e.g., modules or their functions) or methods (e.g., operations) may be implemented by computer program instructions stored in a computer-readable storage medium. In the case that the instructions are executed by at least one processor, the at least one processor may execute the functions corresponding to the instructions. The computer-readable storage medium may be a memory. At least a part of the programming module may be implemented (e.g., executed) by the processor. At least a part of the programming module may include modules, programs, routines, sets of instructions, and processes for executing the at least one function.

The computer-readable storage media include magnetic media such as a floppy disk and a magnetic tape, optical media including a compact disc (CD) ROM and a digital video disc (DVD) ROM, a magneto-optical media such as a floptical disk, and a hardware device designed for storing and executing program commands such as ROM, RAM, and flash memory. The program commands include the language code executable by computers using the interpreter as well as the machine language codes created by a compiler. The aforementioned hardware device can be implemented with one or more software modules for executing the operations of the various exemplary embodiments of the present disclosure.

The module or programming module of the present disclosure may include at least one of the aforementioned components with omission of some components or addition of other components. The operations of the modules, programming modules, or other components may be executed in series, in parallel, recursively, or heuristically. Also, some operations may be executed in different order, omitted, or extended with other operations.

Although various embodiments of the present disclosure have been described using specific terms, the specification and drawings are to be regarded in an illustrative rather than a restrictive sense in order to help understand the present disclosure. It is obvious to those skilled in the art that various modifications and changes can be made thereto without departing from the broader spirit and scope of the disclosure.

The invention claimed is:

1. A method comprising:
checking, at an electronic device supporting a first short range wireless communication and a second short range wireless communication, for a request for the second short range wireless communication during a connection with a first external device through the first short range wireless communication;
checking status information related to the first external device based on at least the check; and
connecting, when the status information fulfils a predetermined condition, the electronic device to a second external device based on the second short range wireless communication,
wherein connecting the electronic device to the second external device includes switching a mode of the electronic device connected to the first external device from a multi-input multiple-output (MIMO) mode to a signal-input single-output (SISO) mode.

2. The method of claim 1, further comprising disabling, when the status information does not fulfil the predetermined condition, the second short range wireless communication.

3. The method of claim 1, wherein checking the status information related to the first external device comprises:
measuring the status information while the first external device is performing the first short range wireless communication; and
checking whether the status information fulfils the predetermined condition based on the status information.

4. The method of claim 1, wherein the predetermined condition is to maintain the connection with the first external device through the first short range wireless communication.

5. The method of claim 1, wherein checking the request comprises:
checking an electric field strength related to the first external device; and
scanning, when the electric field strength does not fulfil a predetermined strength, for an external device capable of replacing the first external device.

6. The method of claim 1, wherein the MIMO mode is a mode for the electronic device to transmit signals to the first external device using multiple antennas, and receive signals from the first external device using multiple antennas, and wherein the SISO mode is a mode for transmitting signals to the first external device using one antenna, and receiving signals from the first external device using one antenna.

7. The method of claim 1, wherein the first short range wireless communication is a communication supporting Wi-Fi, and the second short range wireless communication is a communication supporting mobile hot spot (MHS).

8. The method of claim 1, wherein the status information comprises at least one of a received signal strength indicator (RSSI), a Wi-Fi-based data rate (modulation and coding scheme (MCS)), and a stream.

9. The method of claim 1, wherein the first and second short range wireless communications are based on a same protocol.

10. An electronic device comprising:
a wireless communication unit configured to support a first short range wireless communication and a second short range wireless communication; and
a processor functionally connected to the wireless communication unit,
wherein the processor is configured to:
check for a request for the second short range wireless communication during a connection with a first external device through the first short range wireless communication,
check status information related to the first external device based on at least the check,
switch a mode of the electronic device connected to the first external device from a multi-input multiple-output (MIMO) mode to a signal-input single-output (SISO) mode, and
connect, when the status information fulfils a predetermined condition, the electronic device to a second external device based on the second short range wireless communication.

11. The electronic device of claim 10, wherein the processor is configured to disable, when the status information does not fulfil the predetermined condition, the second short range wireless communication.

12. The electronic device of claim 10, wherein the processor is configured to measure the status information while the first external device is performing the first short range wireless communication and check whether the status information fulfils the predetermined condition based on the status information.

13. The electronic device of claim 10, wherein the predetermined condition is to maintain the connection with the first external device through the first short range wireless communication.

14. The electronic device of claim 10, wherein the processor is configured to check an electric field strength related to the first external device and scan, when the electric field strength does not fulfil a predetermined strength, for an external device capable of replacing the first external device.

15. The electronic device of claim 10, wherein the MIMO mode is a mode for the electronic device to transmit signals to the first external device using multiple antennas, and receive signals from the first external device using multiple antennas, and
wherein the SISO mode is a mode for transmitting signals to the first external device using one antenna, and receiving signals from the first external device using one antenna.

16. The electronic device of claim 10, wherein the first short range wireless communication is a communication supporting Wi-Fi, and the second short range wireless communication is a communication supporting mobile hot spot (MHS).

17. The electronic device of claim 10, wherein the status information comprises at least one of a received signal strength indicator (RSSI), a Wi-Fi-based data rate (modulation and coding scheme (MCS)), and a stream.

18. A non-transitory computer-readable recording medium storing a program corresponding to a wireless communication method of an electronic device that is executable by a computer, the method comprising:
checking, at an electronic device supporting a first short range wireless communication and a second short range wireless communication, for a request for the second short range wireless communication during a connection with a first external device through the first short range wireless communication;
checking status information related to the first external device based on at least the check; and
connecting, when the status information fulfils a predetermined condition, the electronic device to a second external device based on the second short range wireless communication,
wherein connecting the electronic device to the second external device includes switching a mode of the electronic device connected to the first external device from a multi-input multiple-output (MIMO) mode to a signal-input single-output (SISO) mode.

* * * * *